United States Patent
Tamaoka et al.

(10) Patent No.: US 12,474,004 B2
(45) Date of Patent: Nov. 18, 2025

(54) CONNECTION MEMBER AND CONNECTION UNIT

(71) Applicant: Nidec Corporation, Kyoto (JP)

(72) Inventors: Takehito Tamaoka, Kyoto (JP); Yoshihisa Kitamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 34 days.

(21) Appl. No.: 18/396,938

(22) Filed: Dec. 27, 2023

(65) Prior Publication Data

US 2024/0218952 A1 Jul. 4, 2024

(30) Foreign Application Priority Data

Dec. 28, 2022 (JP) .................................. 2022-212735

(51) Int. Cl.
*F16L 37/252* (2006.01)
*F16L 37/34* (2006.01)

(52) U.S. Cl.
CPC ............. *F16L 37/252* (2013.01); *F16L 37/34* (2013.01)

(58) Field of Classification Search
CPC ....... F16L 37/34; F16L 37/107; F16L 37/113; F16L 37/248; F16L 37/252; F16L 37/098
See application file for complete search history.

(56) References Cited

U.S. PATENT DOCUMENTS

| | | | |
|---|---|---|---|
| 3,638,971 A * | 2/1972 | Smith | F16L 37/10 |
| 6,382,680 B1 * | 5/2002 | Horimoto | F16L 37/252 |
| 7,243,953 B2 * | 7/2007 | Nakamura | F16L 37/248 |
| 2009/0184518 A1 * | 7/2009 | Nakamura | F16L 37/113 |
| 2017/0138521 A1 * | 5/2017 | Horimoto | F16L 37/252 |
| 2019/0383433 A1 * | 12/2019 | Tiberghien | F16L 37/40 |

* cited by examiner

*Primary Examiner* — Zachary T Dragicevich
(74) *Attorney, Agent, or Firm* — Keating & Bennett, LLP

(57) ABSTRACT

A connector includes a flow path extending in an axial direction along a central axis, a body including a through hole extending in the axial direction, a pipe including a through hole extending in the axial direction, and a seal including a sealing material between the body and the pipe. The body includes a body-side opposing surface opposing the pipe. The pipe includes a pipe-side opposing surface opposing the body. The seal is between the body-side opposing surface and the pipe-side opposing surface. The seal includes a reservoir in which the sealing material collects between the body-side opposing surface and the pipe-side opposing surface.

12 Claims, 16 Drawing Sheets

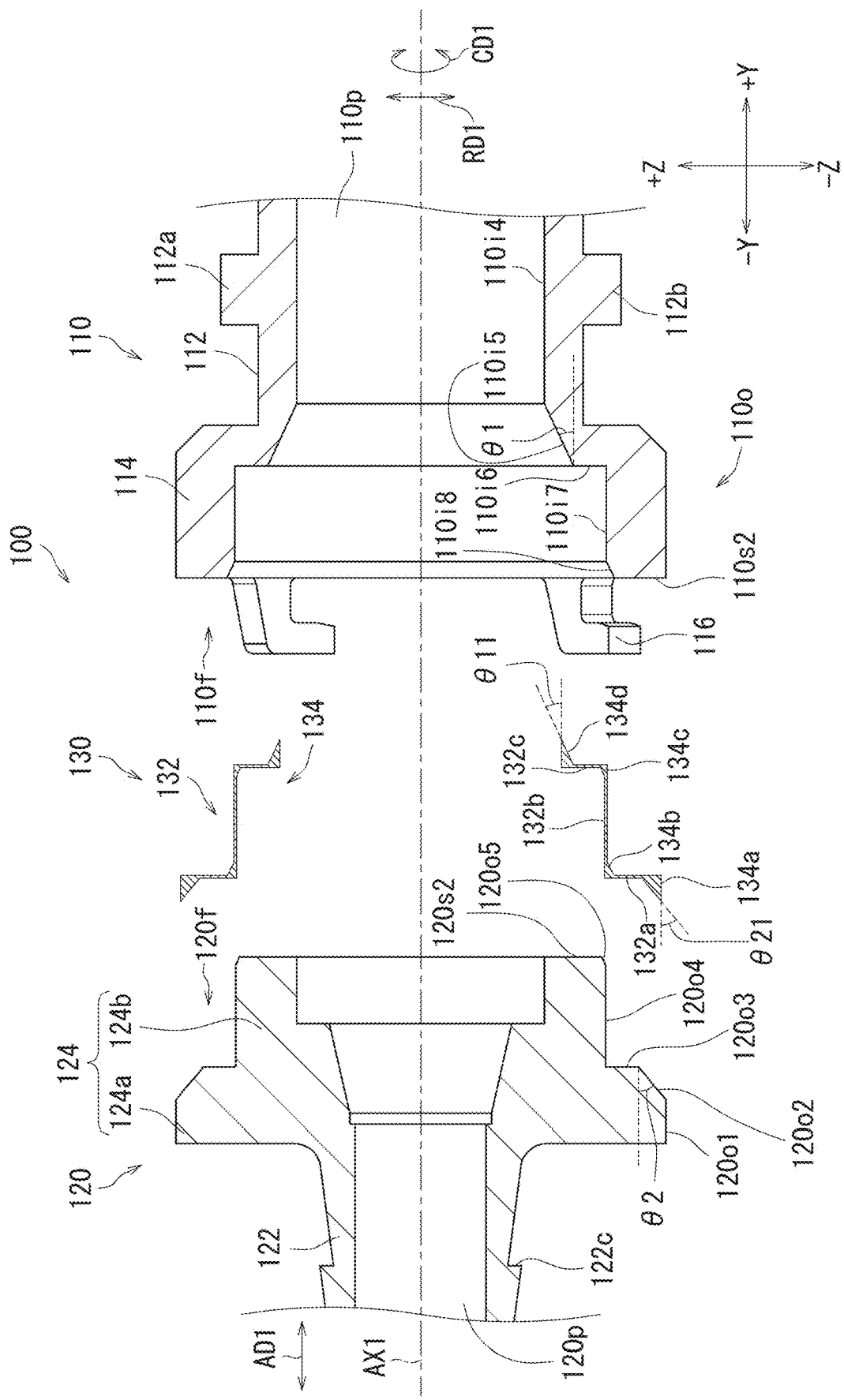

Fig. 16

CONNECTION MEMBER AND CONNECTION UNIT

CROSS-REFERENCE TO RELATED APPLICATIONS

The present application claims priority under 35 U.S.C. § 119 to Japanese Patent Application No. 2022-212735, filed on Dec. 28, 2022, the entire contents of which are hereby incorporated herein by reference.

FIELD OF THE INVENTION

The present disclosure relates to a connector and a connection assembly.

BACKGROUND

By inserting a plug into a socket, it is possible to assemble a pipe coupling that allows a fluid to flow. A pipe coupling that prevents a fluid inside the pipe coupling from leaking when the socket and the plug are connected or disconnected has been examined.

In the conventional pipe coupling described above, the socket has a cylindrical shape integrally formed by screwing a screw groove of a back body with a screw groove of a socket body, and the plug has a cylindrical shape integrally formed by screwing the screw groove of the back body with the screw groove of a plug body.

However, in the conventional socket and plug, if an error occurs in the dimensions between the socket body and the back body and/or the dimensions between the plug body and the back body, the socket and the plug cannot be appropriately assembled, and a fluid may leak.

SUMMARY

An example embodiment of a connector of the present disclosure is provided with a flow path extending in an axial direction along a central axis. The connector includes a body including a through hole extending in the axial direction, a pipe including a through hole extending in the axial direction, and a seal including a sealing material to seal between the body and the pipe. The body includes a body-side opposing surface opposing the pipe. The pipe includes a pipe-side opposing surface opposing the body. The seal is between the body-side opposing surface and the pipe-side opposing surface. The seal includes a reservoir in which the sealing material collects between the body-side opposing surface and the pipe-side opposing surface.

An example embodiment of a connection assembly of the present disclosure includes a first connector and a second connector. Each of the first connector and the second connector is provided with a flow path extending in the axial direction along the central axis. The first connector includes a body including a through hole extending in the axial direction, a pipe including a through hole extending in the axial direction, a seal including a sealing material to seal between the body and the pipe, an elastic in the flow path, and a valve in the through hole and movable in the axial direction in accordance with the elastic in contact with the elastic. In the first connector, the body includes a body-side opposing surface opposing the pipe, the pipe includes a pipe-side opposing surface opposing the body, the seal is positioned between the body-side opposing surface and the pipe-side opposing surface, the seal includes a reservoir in which the sealing material collects between the body-side opposing surface and the pipe-side opposing surface, and the valve closes an opening of the body. The second connector includes a body including a through hole extending in the axial direction, a pipe including a through hole extending in the axial direction, a seal including a sealing material to seal between the body and the pipe, an elastic in the flow path, and a valve in the through hole and movable in the axial direction in accordance with the elastic in contact with the elastic. In the second connector, the body includes a body-side opposing surface opposing the pipe, the pipe includes a pipe-side opposing surface opposing the body, the seal is positioned between the body-side opposing surface and the pipe-side opposing surface, the seal includes a reservoir in which the sealing material collects between the body-side opposing surface and the pipe-side opposing surface, the pipe includes a column, and the valve closes the flow path together with the column.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 6 is an exploded sectional view of a body, a pipe, and a seal in the connector of FIG. 1.

Figure 16:
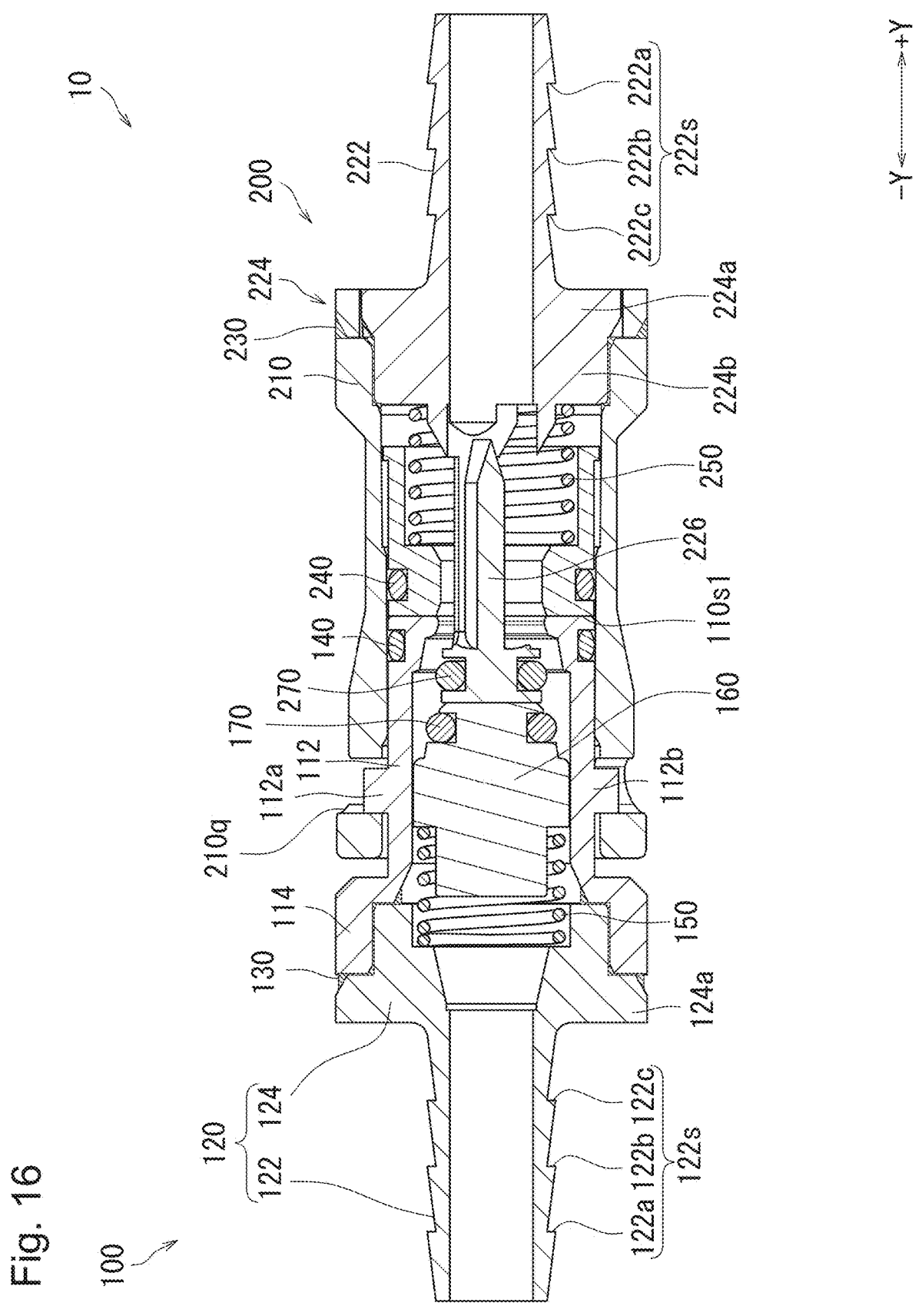

FIG. 16 is a sectional view taken along line XVI-XVI of FIG. 15.

DETAILED DESCRIPTION

Figure 1:
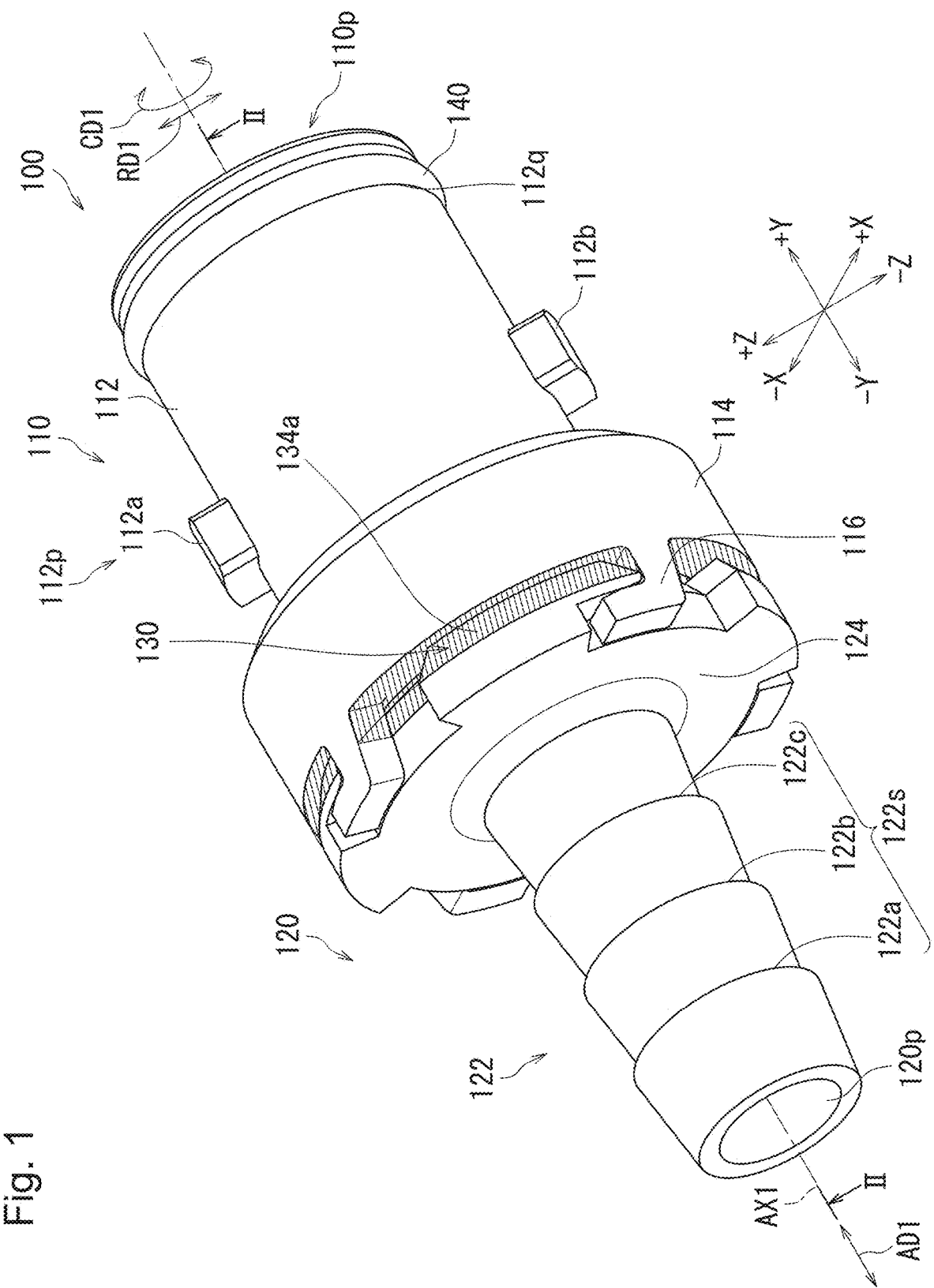
FIG. 1 is a perspective view of a connector according to an example embodiment of the present disclosure.

Hereinafter, example embodiments of the present disclosure will be described with reference to the drawings. Note that in the drawings, the same or corresponding parts will be denoted by the same reference symbols and description will not be repeated. In the drawings, the X, Y, and Z axes of the three-dimensional orthogonal coordinate system are described as appropriate for ease of understanding.

In the present description, a direction parallel to a central axis AX1 (e.g., FIG. 1) of a connector 100 is described as an "axial direction AD1". A direction orthogonal to the central axis AX1 is described as a "radial direction RD1". The "radial direction RD1" may be any direction as long as it is a direction orthogonal to the central axis AX1, and is not particularly limited. A direction along an arc around the central axis AX1 is described as a "circumferential direction CD1".

A direction parallel to a central axis AX2 (e.g., FIG. 8) of a connector 200 is described as an "axial direction AD2". A direction orthogonal to the central axis AX2 is described as a "radial direction RD2". The "radial direction RD2" may be any direction as long as it is a direction orthogonal to the central axis AX2, and is not particularly limited. A direction along an arc around the central axis AX2 is described as a "circumferential direction CD2".

In the present description, a "parallel direction" includes a substantially parallel direction, and an "orthogonal direction" includes a substantially orthogonal direction. Furthermore, in the present description, a "circular shape", "tubular", "annular", a "cylindrical shape", "circular", a "tubular shape", a "round shape", a "wavy shape", and the like do not represent shapes in a strict sense, and include shapes that can achieve the function of the connector 100 or the connector 200 in the present disclosure, for example.

Hereinafter, the connector 100 according to the present example embodiment will be described with reference to FIGS. 1 to 7B. Typically, a tube through which a fluid flows is attached to the connector 100. The connector 100 can be closed so that the fluid flowing through the tube does not flow out. The connector 100 can be configured such that the fluid flowing through the tube flows out in combination with another member. The connector 100 functions as a so-called plug.

First, the connector 100 according to the present example embodiment will be described with reference to FIG. 1. FIG. 1 is a perspective view of the connector 100 according to the present example embodiment.

As shown in FIG. 1, the connector 100 includes a body portion 110, a pipe portion 120, and a sealing portion 130. The body portion 110 is positioned on a +Y direction side with respect to the pipe portion 120. The sealing portion 130 seals between the body portion 110 and the pipe portion 120.

The body portion 110 has a through hole 110p. The through hole 110p extends along the axial direction AD1. For example, the body portion 110 is made of resin.

The pipe portion 120 has a through hole 120p. The through hole 120p is coupled to the through hole 110p. The through hole 120p extends along the axial direction AD1. For example, the pipe portion 120 is made of resin.

The sealing portion 130 is positioned between the body portion 110 and the pipe portion 120. A tube through which a fluid flows is mounted to the pipe portion 120. The sealing portion 130 seals between the body portion 110 and the pipe portion 120. This can suppress the fluid flowing through the tube from flowing out from between the body portion 110 and the pipe portion 120.

The body portion 110 has a tube portion 112 and an attachment portion 114. The attachment portion 114 is coupled in the axial direction AD1 with respect to the tube portion 112. The attachment portion 114 is positioned on a −Y direction side with respect to the tube portion 112.

The tube portion 112 is substantially tubular. The tube portion 112 has a through hole extending along the axial direction AD1. The attachment portion 114 has a through hole communicating with the through hole of the tube portion 112. The pipe portion 120 is attached to the attachment portion 114.

An outer peripheral surface of the tube portion 112 is provided with a protrusion portion 112p. The protrusion portion 112p extends outward in the radial direction from the outer peripheral surface of the tube portion 112. Here, the protrusion portion 112p is provided at each of two locations on the outer peripheral surface of the tube portion 112. The protrusion portion 112p includes a protrusion portion 112a protruding in a +Z direction from the outer peripheral surface of the tube portion 112 and a protrusion portion 112b protruding in a −Z direction from the outer peripheral surface of the tube portion 112.

The attachment portion 114 is substantially tubular. The outer diameter of the outer peripheral surface of the attachment portion 114 is larger than the outer diameter of the outer peripheral surface of the tube portion 112.

The pipe portion 120 has a tube portion 122 and an attachment portion 124. The attachment portion 124 is coupled in the axial direction AD1 with respect to the tube portion 122. The attachment portion 124 is positioned on the +Y direction side with respect to the tube portion 122.

The tube portion 122 has a through hole extending along the axial direction AD1. The attachment portion 124 has a through hole communicating with the through hole of the tube portion 122. The body portion 110 is attached to the attachment portion 124.

Typically, a tube through which a fluid flows is attached to the tube portion 122. The fluid flowing through the tube enters the through hole 110p of the body portion 110 from the through hole 120p of the pipe portion 120.

The outer peripheral surface of the tube portion 122 is provided with a stepped portion 122s. Here, the stepped portion 122s expands outward in the radial direction on the outer peripheral surface of the tube portion 122 when viewed from the axial direction AD1. The stepped portion 122s is substantially circular and extends in the circumferential direction. The stepped portion 122s is provided at each of three locations on the outer peripheral surface of the tube portion 122. The stepped portion 122s includes a stepped portion 122a positioned on the −Y direction side of the outer peripheral surface of the tube portion 122, a stepped portion 122b positioned on the +Y direction side with respect to the stepped portion 122a, and a stepped portion 122c positioned on the +Y direction side with respect to the stepped portion 122b. The stepped portion 122s can suppress the tube from being easily removed from the tube portion 122.

The attachment portion 124 is substantially tubular. The outer diameter of the outer peripheral surface of the attachment portion 124 is larger than the outer diameter of the outer peripheral surface of the tube portion 122.

For example, the sealing portion 130 bonds the body portion 110 and the pipe portion 120. The sealing portion 130 can suppress the fluid from flowing out to the outside from between the body portion 110 and the pipe portion 120.

The connector 100 further includes a hermetic member 140. The body portion 110 is provided with a groove 112q in which the hermetic member 140 is located. The groove 112q extends in the circumferential direction. The hermetic member 140 is located in the groove 110q of the body portion 110. Between the body portion 110 and a member (accommodation member) that accommodates the body portion 110, the hermetic member 140 hermetically seals between the body portion 110 and the accommodation member. For example, the hermetic member 140 is an annular elastic body. In one example, the hermetic member 140 is an O-ring.

The body portion 110 is provided with a claw portion 116. The claw portion 116 is positioned in the −Y direction from the attachment portion 114. The claw portion 116 extends in the −Y direction from the attachment portion 114 and extends to one side in the circumferential direction at a tip end thereof. The claw portion 116 is press-fitted and attached to the attachment portion 124 of the pipe portion 120. The claw portion 116 holds the positions of the body portion 110 and the pipe portion 120. The claw portion 116 is an example of a holding mechanism.

Figure 2:
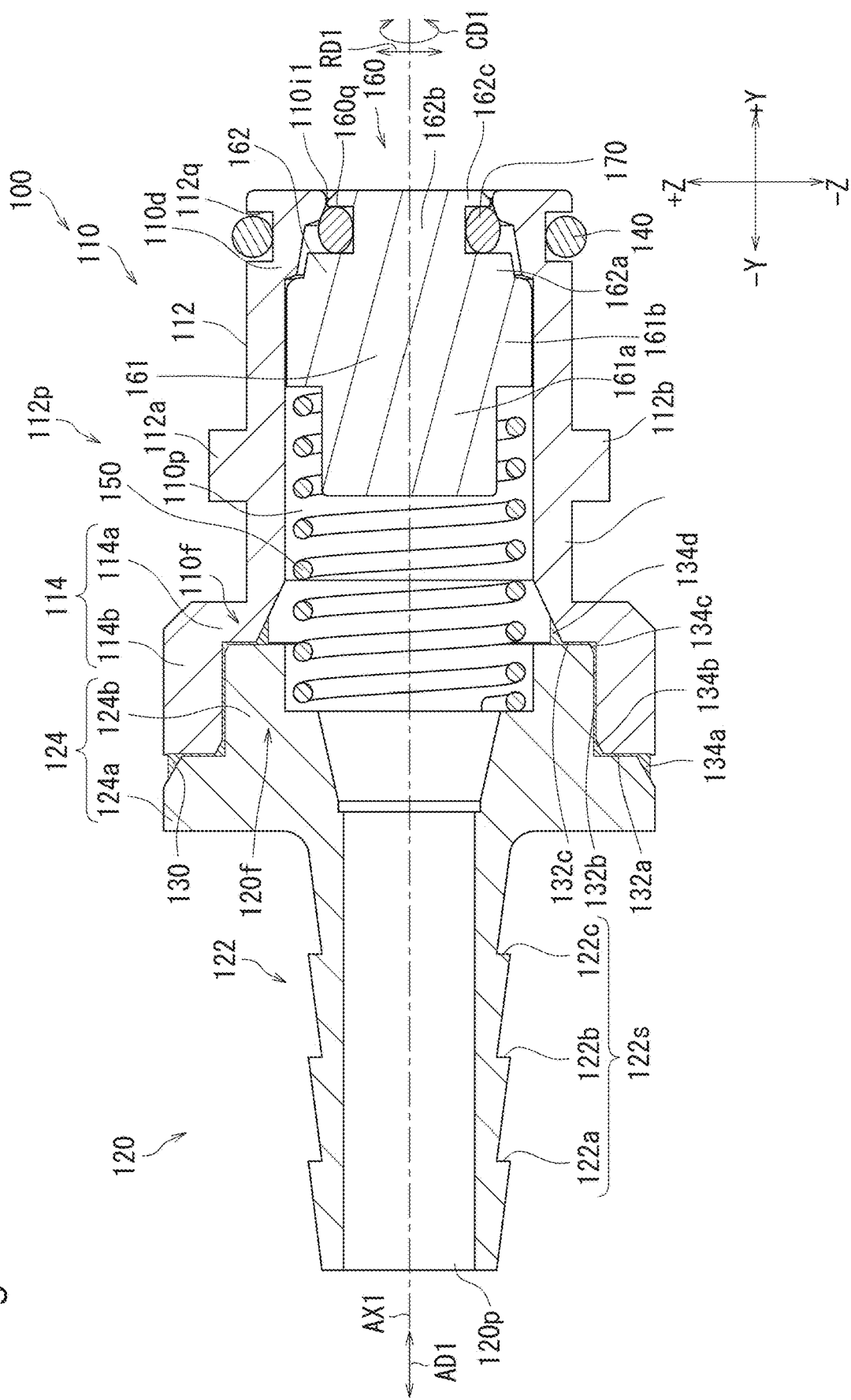
FIG. 2 is a sectional view taken along line II-II of FIG. 1.
Figure 3:
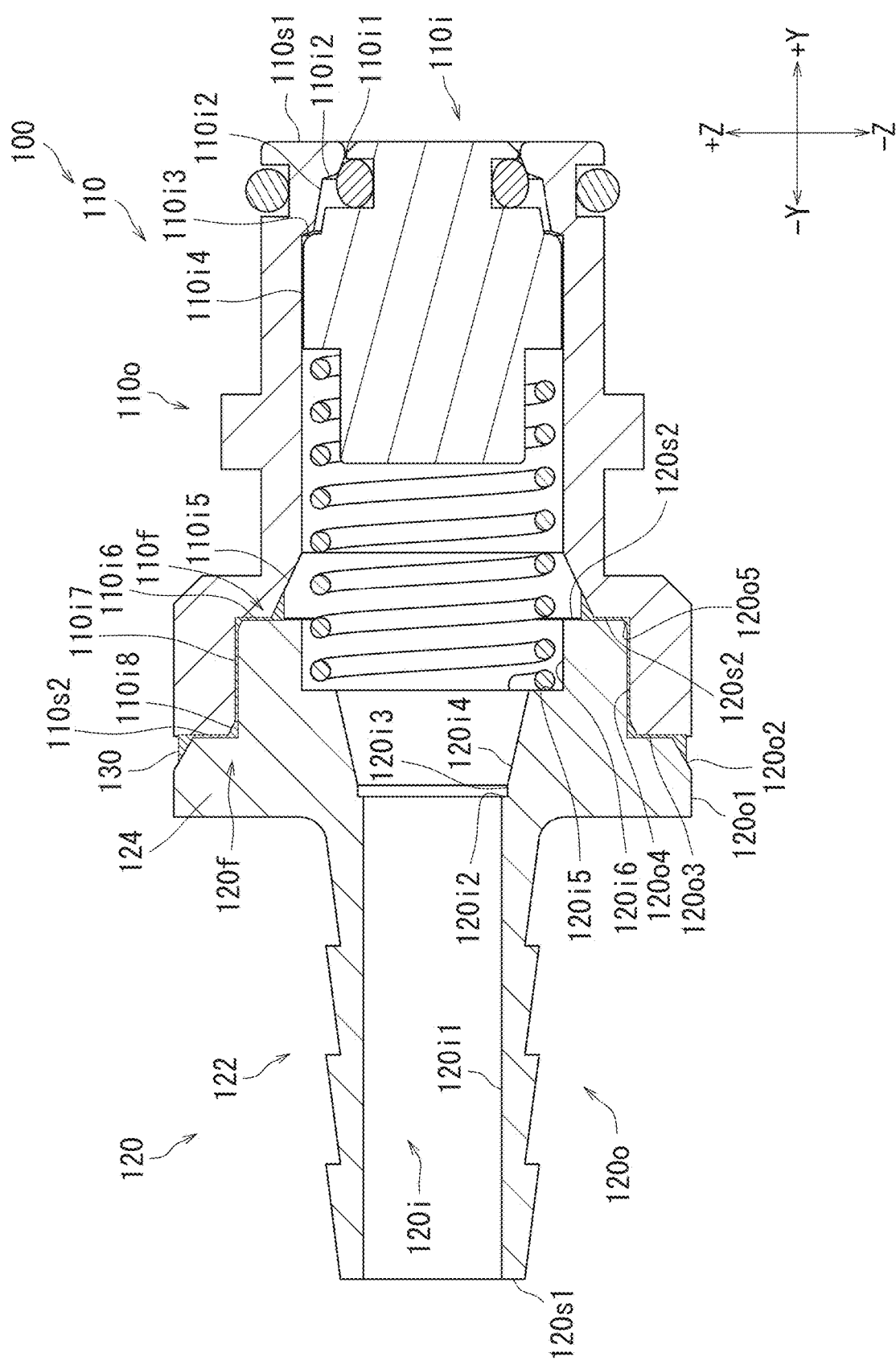
FIG. 3 is a sectional view taken along line II-II of FIG. 1.

Next, the connector 100 according to the present example embodiment will be described with reference to FIGS. 1 to 3. FIGS. 2 and 3 are sectional views taken along line II-II of FIG. 1.

As shown in FIGS. 2 and 3, the connector 100 further includes an elastic portion 150, a moving member 160, and a hermetic member 170 in addition to the body portion 110, the pipe portion 120, the sealing portion 130, and the hermetic member 140.

The body portion 110 extends in the axial direction AD1. The through hole 110p of the body portion 110 extends in the axial direction AD1.

The pipe portion 120 extends in the axial direction AD1. The through hole 120p of the pipe portion 120 extends in the axial direction AD1.

The central axis AX1 of the connector 100 passes through the through hole 110p of the body portion 110 and the through hole 120p of the pipe portion 120.

The pipe portion 120 is partially accommodated in the body portion 110. A part of the pipe portion 120 is located in the through hole 110p of the body portion 110. The through hole 120p of the pipe portion 120 communicates with the through hole 110p of the body portion 110.

The body portion 110 has an opposing surface 110f opposing the pipe portion 120. The pipe portion 120 has an opposing surface 120f opposing the body portion 110. The opposing surface 110f of the body portion 110 and the opposing surface 120f of the pipe portion 120 face each other. The opposing surface 110f of the body portion 110 is an example of a body portion-side opposing surface, and the opposing surface 120f of the pipe portion 120 is an example of a pipe portion-side opposing surface.

The sealing portion 130 is positioned between the body portion 110 and the pipe portion 120. The sealing portion 130 is positioned between the opposing surface 110f of the body portion 110 and the opposing surface 120f of the pipe portion 120. The sealing portion 130 seals between the opposing surface 110f of the body portion 110 and the opposing surface 120f of the pipe portion 120. This can suppress the fluid flowing through the tube from flowing out from between the body portion 110 and the pipe portion 120.

The body portion 110 has the tube portion 112 and the attachment portion 114. The attachment portion 114 is positioned in the −Y direction with respect to the tube portion 112. The attachment portion 114 is coupled in the axial direction AD1 with respect to the tube portion 112. The outer diameter (length in the radial direction) of the attachment portion 114 is larger than the outer diameter (length in the radial direction) of the tube portion 112.

The protrusion portion 112a protrudes in the +Z direction from the outer peripheral surface of the tube portion 112. The protrusion portion 112b protrudes in the −Z direction from the outer peripheral surface of the tube portion 112.

The attachment portion 114 has a communication portion 114a and a bottom tube portion 114b. Each of the communication portion 114a and the bottom tube portion 114b is substantially tubular. The communication portion 114a is positioned between the tube portion 112 and the bottom tube portion 114b. In the connection portion between the communication portion 114a and the tube portion 112, the inner diameter of the communication portion 114a increases toward the −Y direction.

The length in the axial direction AD1 of the communication portion 114a is smaller than the length in the axial direction AD1 of the bottom tube portion 114b. The inner diameter of the inner peripheral surface of the bottom tube portion 114b is larger than the inner diameter of the inner peripheral surface of the communication portion 114a.

The body portion 110 has a substantially cylindrical shape. The body portion 110 has an outer peripheral surface 110o, an inner peripheral surface 110i, a side surface 110s1, and a side surface 110s2. The side surface 110s1 is positioned in the +Y direction, and the side surface 110s2 is positioned in the −Y direction.

The inner peripheral surface 110i has a part 110i1, a part 110i2, a part 110i3, a part 110i4, a part 110i5, a part 110i6, a part 110i7, and a part 110i8.

The part 110i1 connects the side surface 110s1 and the part 110i2. The part 110i1 has a curved shape. The part 110i1 corresponds to the narrowest part of the inner diameter of the through hole 110p. The part 110i1 is a part of the inner peripheral surface of the tube portion 112.

The part 110i2 connects the part 110i1 and the part 110i3. The inner diameter of the part 110i2 increases toward the −Y direction. The part 110i2 is a part of the inner peripheral surface of the tube portion 112.

The part 110i3 connects the part 110i2 and the part 110i4. The inner diameter of the part 110i3 increases toward the −Y direction. The slant angle of the part 110i3 is smaller than the slant angle of the part 110i2. The part 110i3 is a part of the inner peripheral surface of the tube portion 112.

The part 110i4 connects the part 110i3 and the part 110i5. The part 110i4 extends in the axial direction AD1. The part 110i4 is a part of the inner peripheral surface of the tube portion 112.

The inner peripheral surface 110i of the body portion 110 is provided with steps in the part 110i2 to the part 110i4. In the inner peripheral surface 110i, the inner diameter of the part 110i2 is smaller than the inner diameter of the part 110i4.

The part 110i5 connects the part 110i4 and the part 110i6. The inner diameter of the part 110i5 increases toward the −Y direction. The part 110i5 is a part of the inner peripheral surface of the tube portion 112 and a part of the inner peripheral surface of the attachment portion 114.

The part 110i6 connects the part 110i5 and the part 110i7. The part 110i6 extends in the radial direction RD1. The part 110i6 is a part of the inner peripheral surface of the attachment portion 114.

The part 110i7 connects the part 110i6 and the part 110i8. The part 110i7 extends in the axial direction AD1. The part 110i7 is a part of the inner peripheral surface of the attachment portion 114.

The part 110i8 connects the part 110i7 and the side surface 110s2. The inner diameter of the part 110i8 increases toward the −Y direction. The part 110i8 is a part of the inner peripheral surface of the attachment portion 114.

The opposing surface 110f of the body portion 110 includes a part of the inner peripheral surface 110i and a part of the side surface 110s2. Here, the opposing surface 110f of the body portion 110 includes a part of the part 110$i$5 of the inner peripheral surface 110$i$, the parts 110$i$6 to 110$i$8, and a part of the side surface 110$s$2.

The pipe portion 120 has the tube portion 122 and the attachment portion 124. The attachment portion 124 is coupled in the axial direction AD1 with respect to the tube portion 122. The tube portion 122 has a through hole extending along the axial direction AD1. The attachment portion 124 has a through hole communicating with the through hole of the tube portion 122. The body portion 110 is attached to the attachment portion 124.

The attachment portion 124 has a base portion 124$a$ and a projection portion 124$b$. Each of the base portion 124$a$ and the projection portion 124$b$ is substantially tubular. The base portion 124$a$ is positioned between the tube portion 122 and the projection portion 124$b$. The inner diameter of the base portion 124$a$ increases toward the +Y direction. The inner diameter of the projection portion 124$b$ is larger than the inner diameter of the base portion 124$a$. The outer diameter of the projection portion 124$b$ is smaller than the outer diameter of the base portion 124$a$.

The pipe portion 120 has a substantially cylindrical shape. The pipe portion 120 has an outer peripheral surface 120$o$, an inner peripheral surface 120$i$, a side surface 120$s$1, and a side surface 120$s$2. The side surface 120$s$1 is positioned in the −Y direction, and the side surface 120$s$2 is positioned in the +Y direction.

The inner peripheral surface 120$i$ has a part 120$i$1, a part 120$i$2, a part 120$i$3, a part 120$i$4, a part 120$i$5, and a part 120$i$6.

The part 120$i$1 connects the side surface 120$s$1 and the part 120$i$2. The part 120$i$1 extends in the axial direction AD1. The inner diameter of the part 120$i$1 is substantially constant. The part 120$i$1 is the inner peripheral surface of the tube portion 122 and a part of the inner peripheral surface of the attachment portion 124.

The part 120$i$2 connects the part 120$i$1 and the part 120$i$3. The part 120$i$2 extends in the radial direction RD1. The part 120$i$2 is a part of the inner peripheral surface of the attachment portion 124.

The part 120$i$3 connects the part 120$i$2 and the part 120$i$4. The part 120$i$3 extends in the axial direction AD1. The part 120$i$3 is a part of the inner peripheral surface of the attachment portion 124.

The part 120$i$4 connects the part 120$i$3 and the part 120$i$5. The inner diameter of the part 120$i$4 increases toward the +Y direction. The part 120$i$4 is a part of the inner peripheral surface of the attachment portion 124.

The part 120$i$5 connects the part 120$i$4 and the part 120$i$6. The part 120$i$5 extends in the radial direction RD1. The part 120$i$5 is a part of the inner peripheral surface of the attachment portion 124.

The part 120$i$6 connects the part 120$i$5 and the side surface 120$s$2. The part 120$i$6 extends in the axial direction AD1. The part 120$i$6 is a part of the inner peripheral surface of the attachment portion 124.

The outer peripheral surface 120$o$ has a part 120$o$1, a part 120$o$2, a part 120$o$3, a part 120$o$4, and a part 120$o$5.

The part 120$o$1 is positioned outside in the radial direction of the attachment portion 124. The part 120$o$1 is connected to the part 120$o$2. The part 120$o$1 extends in the axial direction AD1. The outer diameter of the part 120$o$1 is substantially constant. The part 120$o$1 is a part of the outer peripheral surface of the attachment portion 124.

The part 120$o$2 connects the part 120$o$1 and the part 120$o$3. The part 120$o$2 extends obliquely with respect to the axial direction AD1. The outer diameter of the part 120$o$2 decreases toward the +Y direction. The part 120$o$2 is a part of the outer peripheral surface of the attachment portion 124.

The part 120$o$3 connects the part 120$o$2 and the part 120$o$4. The part 120$o$3 extends in the radial direction RD1. The part 120$o$3 is a part of the outer peripheral surface of the attachment portion 124.

The part 120$o$4 connects the part 120$o$3 and the part 120$o$5. The part 120$o$4 extends in the axial direction AD1. The part 120$o$4 is a part of the outer peripheral surface of the attachment portion 124.

The part 120$o$5 connects the part 120$o$4 and the side surface 120$s$2. The part 120$o$5 extends obliquely with respect to the axial direction AD1. The outer diameter of the part 120$o$5 decreases toward the +Y direction. The part 120$o$5 is a part of the outer peripheral surface of the attachment portion 124.

The opposing surface 120$f$ of the pipe portion 120 includes a part of the outer peripheral surface 120$o$ and a part of the side surface 120$s$2. Here, the opposing surface 120$f$ of the pipe portion 120 includes a part of the part 120$o$2 of the outer peripheral surface 120$o$, the parts 120$o$3 to 120$o$5, and a part of the side surface 120$s$2.

The elastic portion 150, the moving member 160, and the hermetic member 170 are accommodated in the through hole 110$p$ of the body portion 110 and the through hole 120$p$ of the pipe portion 120.

The elastic portion 150 extends in the axial direction AD1. The −Y direction side end portion of the elastic portion 150 opposes the pipe portion 120. The +Y direction side end portion of the elastic portion 150 opposes the moving member 160. For example, the elastic portion 150 is a spring. In one example, the elastic portion 150 is a coil spring.

The moving member 160 is positioned on the +Y direction side with respect to the elastic portion 150. The moving member 160 comes into contact with the elastic portion 150 and moves with respect to the body portion 110 in accordance with the motion of the elastic portion 150. The moving member 160 is movable in the axial direction AD1 with respect to the body portion 110. The moving member 160 moves in the −Y direction with respect to the body portion 110, whereby the flow path of the connector 100 is opened. The moving member 160 moves in the +Y direction with respect to the body portion 110 and closes the opening portion of the body portion 110, thereby closing the flow path of the connector 100. The width (length in the radial direction RD1) of the moving member 160 is substantially equal to the inner diameter of the part 110$i$4 of the inner peripheral surface 110$i$ or slightly smaller than the inner diameter of the part 110$i$4. The moving member 160 is an example of a valve portion.

The moving member 160 has a plate-shaped portion 161 and a columnar portion 162. The plate-shaped portion 161 is positioned on the −Y direction side with respect to the columnar portion 162. The plate-shaped portion 161 is substantially plate-shaped. The columnar portion 162 includes a plurality of substantially circular cylindrical shape parts having different outer diameters. The width (length in the radial direction RD1) of the plate-shaped portion 161 is larger than the width of the columnar portion 162.

The plate-shaped portion 161 has a part 161$a$ and a part 161$b$. The part 161$a$ is positioned on the −Y direction side with respect to the part 161$b$. The outer diameter in the radial direction of the part 161$a$ is smaller than the outer diameter in the radial direction of the part 161$b$.

The part 161a is positioned inside in the radial direction of the elastic portion 150. The length in the radial direction RD1 of the part 161a is smaller than the inner diameter of the elastic portion 150.

The part 161b is positioned outside in the axial direction of the elastic portion 150. The length in the radial direction RD1 of the part 161b is larger than the outer diameter of the elastic portion 150.

The columnar portion 162 has a part 162a, a part 162b, and a part 162c. Each of the parts 162a to 162c has a substantially circular cylindrical shape.

The part 162a, the part 162b, and the part 162c are located in the axial direction AD1. The part 162b is coupled on the +Y direction side with respect to the part 162a. The part 162c is coupled on the +Y direction side with respect to the part 162b.

The part 162a is positioned on the +Y direction side with respect to the plate-shaped portion 161. The length in the radial direction RD1 of the part 162a is smaller than the outer diameter of the part 161b of the plate-shaped portion 161. The length in the radial direction RD1 of the part 162a is larger than the inner diameter of the opening portion of the tube portion 112.

The part 162b is positioned between the part 162a and the part 162c along the axial direction AD1. The length in the radial direction RD1 of the part 162b is smaller than the length in the radial direction RD1 of each of the part 162a and the part 162c. The sum of the length in the radial direction RD1 of the part 162b and the thickness of the hermetic member 170 is larger than the inner diameter of the opening portion of the tube portion 112.

The part 162c is coupled to the part 162b. The length in the radial direction RD1 of the part 162c is slightly larger than the inner diameter of the part 110i1 of the inner peripheral surface 110i of the body portion 110.

The part 162a to the part 162c form a groove 160q. The hermetic member 170 is located in the groove 160q.

In the moving member 160, the length in the radial direction RD1 of the part 162a of the columnar portion 162 is smaller than the inner diameter of the part 110i3 of the inner peripheral surface 110i of the body portion 110 and larger than the inner diameter of the part 110i1 of the inner peripheral surface 110i of the body portion 110. Therefore, even when the hermetic member 170 is excessively crushed, the columnar portion 162 of the moving member 160 can be suppressed from coming out of the through hole 110p of the body portion 110.

In the moving member 160, the length in the radial direction RD1 of the part 161b of the plate-shaped portion 161 is larger than the inner diameter of the part 110i3 of the inner peripheral surface 110i of the body portion 110. Therefore, the plate-shaped portion 161 of the moving member 160 is suppressed from proceeding to the +Y direction side relative to a predetermined position of the through hole 110p of the body portion 110.

As described above, the moving member 160 is provided with the groove 160q in which the hermetic member 170 is located. The groove 160q extends in the circumferential direction. The hermetic member 170 is located in the groove 160q of the moving member 160. The hermetic member 170 hermetically seals between the body portion 110 and the moving member 160. For example, the hermetic member 170 is an annular elastic body. In one example, the hermetic member 170 is an O-ring.

Figure 4:
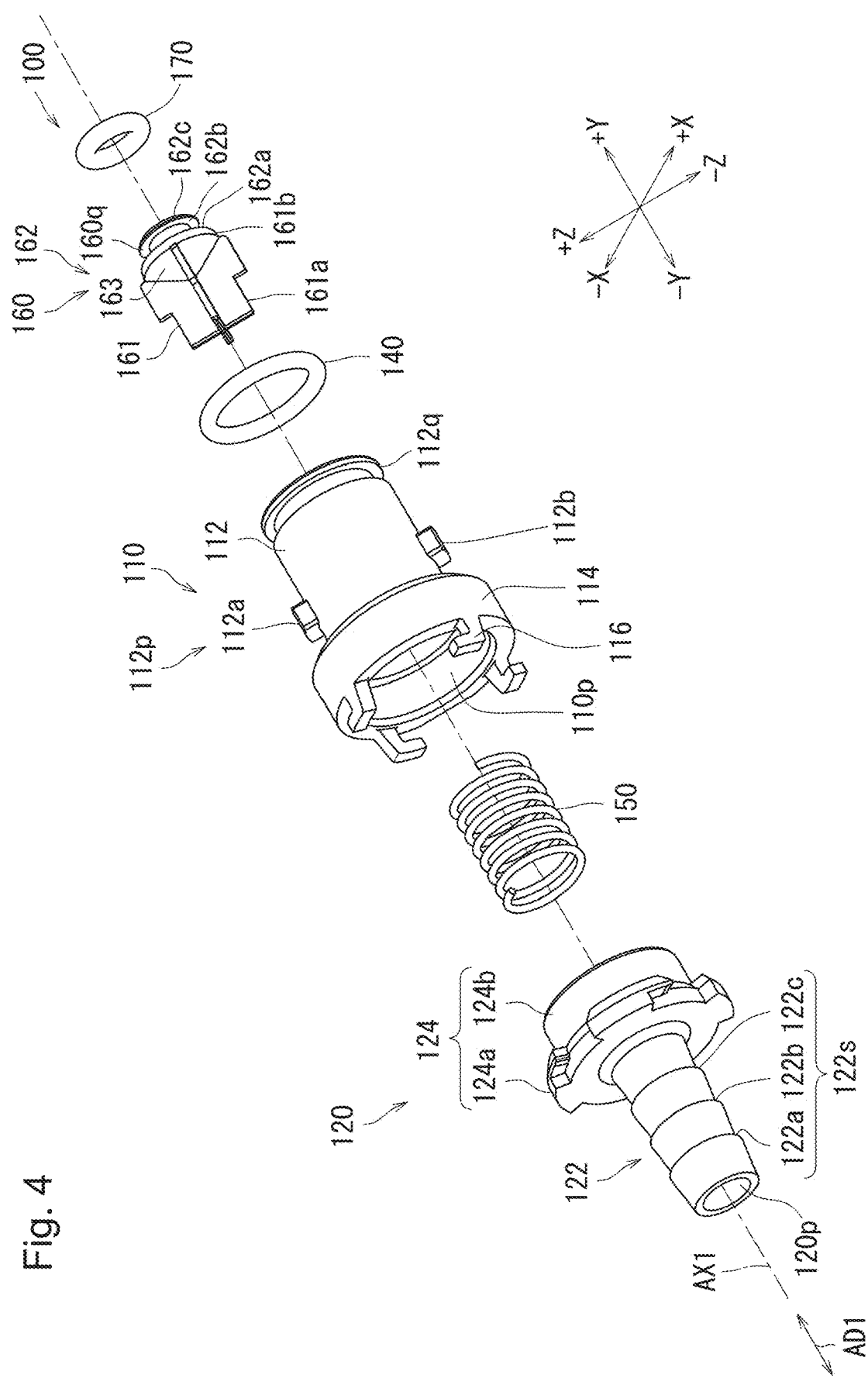
FIG. 4 is an exploded perspective view of the connector of FIG. 1.

Next, the connector 100 according to the present example embodiment will be described with reference to FIGS. 1 to 4. FIG. 4 is an exploded perspective view of the connector 100 of FIG. 1. Note that in FIG. 4, the sealing portion 130 is omitted in order to avoid the drawing from being excessively complicated.

As shown in FIG. 4, in the connector 100, the body portion 110, the pipe portion 120, the hermetic member 140, the elastic portion 150, the moving member 160, and the hermetic member 170 are arrayed along the central axis AX1. The through hole 120p of the pipe portion 120 is connected to the through hole 110p of the body portion 110. The elastic portion 150, the moving member 160, and the hermetic member 170 are accommodated in the through hole 110p of the body portion 110 and the through hole 120p of the pipe portion 120.

The hermetic member 140 is located in the groove 112q of the body portion 110. The hermetic member 140 is positioned in the circumferential direction at the end portion on the +Y direction side of the tube portion 112.

The elastic portion 150 is located across the through hole 120p of the pipe portion 120 and the through hole 110p of the body portion 110.

The moving member 160 is located in the through hole 110p of the body portion 110.

The moving member 160 further includes a coupling portion 163 in addition to the four plate-shaped portions 161 and the columnar portion 162. The coupling portion 163 couples on a slant across the columnar portion 162 and adjacent two plate-shaped portions 161 among the four plate-shaped portions 161. The coupling portion 163 has a slant surface slanting with respect to the columnar portion 162.

The hermetic member 140 is located in the groove 160q of the moving member 160. The hermetic member 140 is positioned in the circumferential direction at the end portion on the +Y direction side of the moving member 160.

Figure 5:
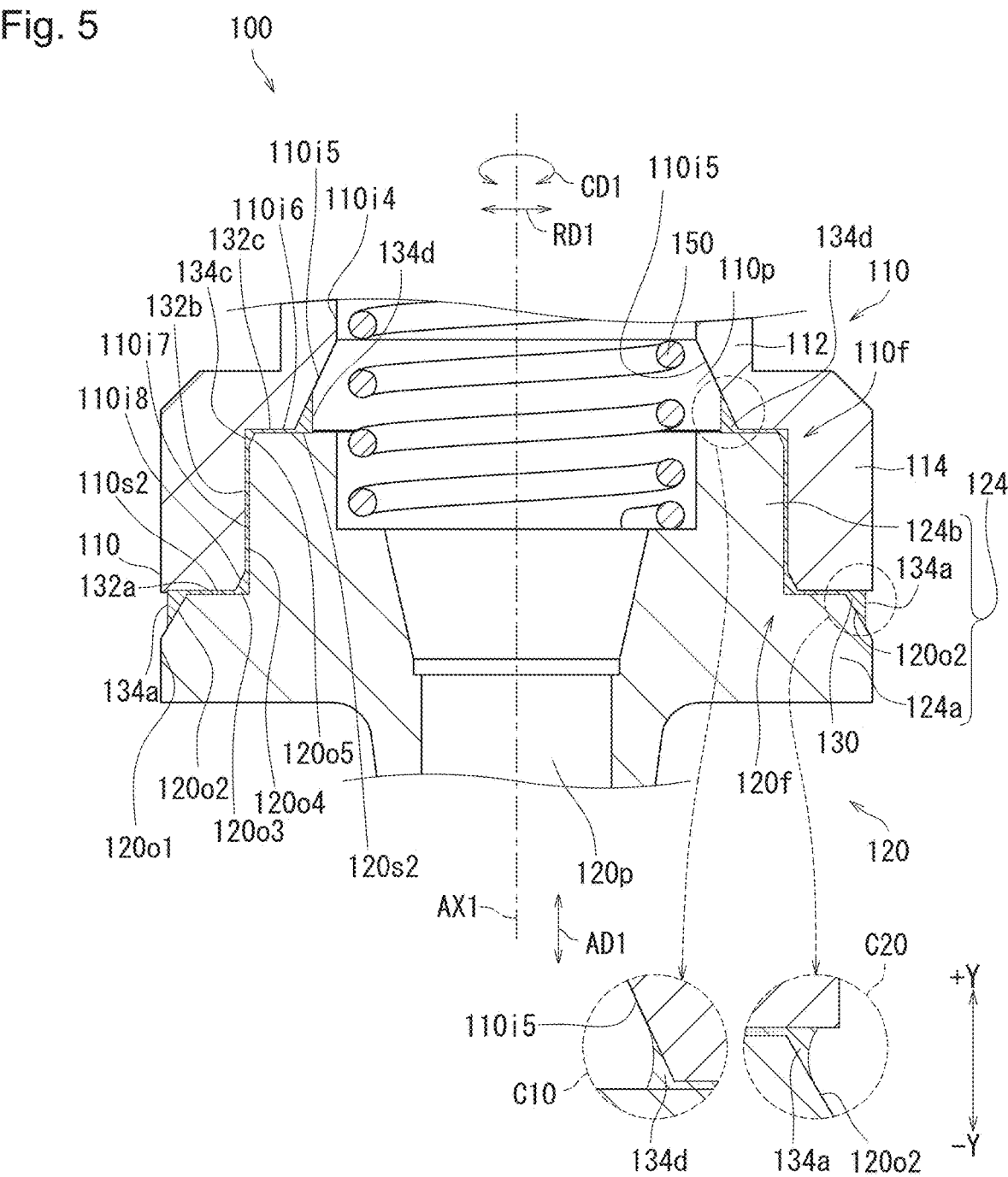
FIG. 5 is a partially enlarged view of FIG. 2.

Next, the connector 100 according to the present example embodiment will be described with reference to FIGS. 1 to 6. FIG. 5 is a partially enlarged view of FIG. 2. FIG. 6 is an exploded sectional view of the body portion 110, the pipe portion 120, and the sealing portion 130 in the connector 100 of FIG. 1.

As shown in FIGS. 5 and 6, the through hole 110p of the body portion 110 and the through hole 120p of the pipe portion 120 communicate with each other.

The elastic portion 150 is located across the through hole 110p of the body portion 110 and the through hole 120p of the pipe portion 120.

The body portion 110 opposes the pipe portion 120. The body portion 110 has the opposing surface 110f opposing the pipe portion 120.

In the body portion 110, the part 110i5, the part 110i6, the part 110i7, the part 110i8, and the side surface 110s2 face the pipe portion 120. The part 110i5, the part 110i6, the part 110i7, the part 110i8, and the side surface 110s2 constitute the opposing surface 110f.

The part 110i5 extends obliquely with respect to the axial direction AD1. The inner diameter of the part 110i5 increases toward the −Y direction. The part 110i5 connects the part 110i4 and the part 110i6. The part 110i5 is a cutout surface where the part 110i4 is cut out.

The part 110i6 extends in the radial direction RD1 and the circumferential direction CD1. The normal line of the part 110i6 extends in the axial direction AD1.

The part 110i7 extends in the axial direction AD1 and the circumferential direction CD1. The normal line of the part 110i7 extends in the radial direction RD1.

The part 110i8 extends obliquely with respect to the axial direction AD1. The inner diameter of the part 110i8 increases toward the −Y direction. The part 110*i*8 connects the part 110*i*7 and the side surface 110*s*2. The part 110*i*8 is a cutout surface where the part 110*i*7 is cut out.

The side surface 110*s*2 connects the part 110*i*8 of the inner peripheral surface and the outer peripheral surface 110*o*. The side surface 110*s*2 extends in the radial direction RD1 and the circumferential direction CD1. The normal line of the side surface 110*s*2 extends in the axial direction AD1.

The pipe portion 120 opposes the body portion 110. The pipe portion 120 has the opposing surface 120*f* opposing the body portion 110.

In the pipe portion 120, the part 120*o*2, the part 120*o*3, the part 120*o*4, the part 120*o*5, and the side surface 120*s*2 constitute the opposing surface 120*f*.

The part 120*o*2 connects the part 120*o*1 and the part 120*o*3. The part 120*o*2 is a cutout surface where the part 120*o*1 is cut out.

The part 120*o*3 extends in the radial direction RD1 and the circumferential direction CD1. The normal line of the part 120*o*3 extends in the axial direction AD1.

The part 120*o*4 extends in the axial direction AD1 and the circumferential direction CD1. The normal line of the part 120*o*4 extends in the radial direction RD1.

The part 120*o*5 connects the part 120*o*4 and the side surface 120*s*2. The part 120*o*5 is a cutout surface where the part 120*o*4 is cut out.

The side surface 120*s*2 extends in the radial direction RD1 and the circumferential direction CD1. The normal line of the side surface 120*s*2 extends in the axial direction AD1.

On the inner peripheral surface 110*i* and the side surface 110*s*2 of the body portion 110 and the outer peripheral surface 120*o* and the side surface 120*s*2 of the pipe portion 120, the part 110*i*5 opposes the side surface 120*s*2, and the part 110*i*6 opposes the side surface 120*s*2 and the part 120*o*5. The part 110*i*7 opposes the part 120*o*5 and the part 120*o*4, the part 110*i*8 opposes the part 120*o*4 and the part 120*o*3, and the side surface 110*s* opposes the part 120*o*3 and the part 120*o*2.

The sealing portion 130 has a plate-shaped portion 132 and a reservoir portion 134. The plate-shaped portion 132 is positioned at a place where a part of the opposing surface 110*f* of the body portion 110 and a part of the opposing surface 120*f* of the pipe portion 120 are parallel to each other.

The reservoir portion 134 is positioned adjacent to the plate-shaped portion 132. The thickness of the reservoir portion 134 is larger than the thickness of the plate-shaped portion 132.

For example, the reservoir portion 134 is positioned between two planar parts of the opposing surface 110*f* of the body portion 110 and a cutout surface of the opposing surface 120*f* of the pipe portion 120. Alternatively, the reservoir portion 134 is positioned between a cutout surface of the opposing surface 110*f* of the body portion 110 and two planar parts of the opposing surface 120*f* of the pipe portion 120.

According to the present example embodiment, since the sealing portion 130 sealing between the body portion 110 and the pipe portion 120 has the reservoir portion 134, it is possible to suppress fluid leakage from the body portion 110 and the pipe portion 120.

In the connector 100 of the present example embodiment, the sealing portion 130 has a plurality of divided plate-shaped portions 132 and a plurality of divided reservoir portions 134. The plate-shaped portion 132 includes a first plate-shaped portion 132*a*, a second plate-shaped portion 132*b*, and a third plate-shaped portion 132*c*. The second plate-shaped portion 132*b* is coupled to the first plate-shaped portion 132*a*, and the third plate-shaped portion 132*c* is coupled to the second plate-shaped portion 132*b*.

In the present description, a reservoir portion positioned on the outermost side in the radial direction among the plurality of reservoir portions 134 may be described as an outer diameter-side reservoir portion, and a reservoir portion positioned on the innermost side in the radial direction among the plurality of reservoir portions 134 may be described as an inner diameter-side reservoir portion.

The first plate-shaped portion 132*a* extends in the radial direction RD1 and the circumferential direction CD1. The first plate-shaped portion 132*a* is positioned between the opposing surface 110*f* of the body portion 110 and the opposing surface 120*f* of the pipe portion 120 opposing each other in the axial direction AD1. In detail, the first plate-shaped portion 132*a* is positioned between the side surface 110*s*2 of the body portion 110 and the part 120*o*3 of the pipe portion 120. The first plate-shaped portion 132*a* extends in an arc shape in the circumferential direction CD1.

The second plate-shaped portion 132*b* extends in the axial direction AD1 and the circumferential direction CD1. The second plate-shaped portion 132*b* is positioned between the opposing surface 110*f* of the body portion 110 and the opposing surface 120*f* of the pipe portion 120 opposing each other in the radial direction. In detail, the second plate-shaped portion 132*b* is positioned between the part 110*i*7 of the body portion 110 and the part 120*o*4 of the pipe portion 120. The second plate-shaped portion 132*b* extends tubularly in the circumferential direction CD1.

The third plate-shaped portion 132*c* extends in the radial direction RD1 and the circumferential direction CD1. The third plate-shaped portion 132*c* is positioned between the opposing surface 110*f* of the body portion 110 and the opposing surface 120*f* of the pipe portion 120 opposing each other in the axial direction. In detail, the third plate-shaped portion 132*c* is positioned between the part 110*i*6 of the body portion 110 and the side surface 120*s*2 of the pipe portion 120. The third plate-shaped portion 132*c* extends annularly in the circumferential direction CD1.

The reservoir portion 134 has a first reservoir portion 134*a*, a second reservoir portion 134*b*, a third reservoir portion 134*c*, and a fourth reservoir portion 134*d*.

The first reservoir portion 134*a* is positioned at the outer end portion in the radial direction of the first plate-shaped portion 132*a*. The first reservoir portion 134*a* is positioned between the side surface 110*s*2 of the body portion 110 and the part 120*o*2 of the pipe portion 120. The first reservoir portion 134*a* expands on the pipe portion 120 side in accordance with the part 120*o*2 of the pipe portion 120. The first reservoir portion 134*a* extends in an arc shape in the circumferential direction CD1.

The second reservoir portion 134*b* is positioned across the boundary between the first plate-shaped portion 132*a* and the second plate-shaped portion 132*b*. The second reservoir portion 134*b* is positioned between the part 110*i*8 of the body portion 110 and the parts 120*o*3 and 120*o*4 of the pipe portion 120. The second reservoir portion 134*b* expands on the body portion 110 side in accordance with the part 110*i*8 of the body portion 110. The second reservoir portion 134*b* extends annularly in the circumferential direction CD1.

The third reservoir portion 134*c* is positioned across the boundary between the second plate-shaped portion 132*b* and the third plate-shaped portion 132*c*. The third reservoir portion 134*c* is positioned between the parts 110*s*6 and 110*s*7 of the body portion 110 and the part 120*o*5 of the pipe portion 120. The third reservoir portion 134*c* expands on the pipe portion 120 side in accordance with the part 120o5 of the pipe portion 120. The third reservoir portion 134c extends annularly in the circumferential direction CD1.

The fourth reservoir portion 134d is positioned at the inner end portion in the radial direction of the third plate-shaped portion 132c. The fourth reservoir portion 134d is positioned between the part 110i5 of the body portion 110 and the side surface 120s2 of the pipe portion 120. The fourth reservoir portion 134d expands on the body portion 110 side in accordance with the part 110i5 of the body portion 110. The fourth reservoir portion 134d extends annularly in the circumferential direction CD1.

In this manner, the first reservoir portion 134a to the fourth reservoir portion 134d are formed corresponding to the part 120o2 of the pipe portion 120, the part 110i8 of the body portion 110, the part 120o5 of the pipe portion 120, and the part 110i5 of the body portion 110, respectively, that are slanting with respect to the axial direction AD1 or the radial direction RD1. The sealing material enters and collects in a space defined by the part 120o2 of the pipe portion 120, the part 110i8 of the body portion 110, the part 120o5 of the pipe portion 120, and the part 110i5 of the body portion 110 due to capillary action, whereby the first reservoir portion 134a to the fourth reservoir portion 134d are formed.

In the present description, a reservoir portion positioned on one axial side (−Y direction) with respect to the second plate-shaped portion 132b extending in the axial direction AD1 may be described as one axial side reservoir portion, and a reservoir portion positioned on the axial other side (+Y direction) may be described as another axial side reservoir portion. Here, the second reservoir portion 134b is one axial side reservoir portion, and the third reservoir portion 134c is another axial side reservoir portion.

As shown in FIG. 6, the body portion 110 opposes the pipe portion 120 via the sealing portion 130. The sealing portion 130 is positioned between the body portion 110 and the pipe portion 120. The sealing portion 130 is formed in accordance with the shapes of the opposing surface 110f of the body portion 110 and the opposing surface 120f of the pipe portion 120.

The sealing portion 130 has a sealing material. For example, the sealing material includes an adhesive. In one example, the adhesive includes an epoxy resin. The epoxy resin can achieve low-temperature curability, flexibility, and resistance to fracture. Specific examples of the adhesive include NB3041B. Alternatively, the adhesive includes AE-780.

The difference between the solubility parameter (SP value) of the sealing material and the solubility parameter of the fluid flowing through the connector 200 is preferably 1 or greater. For example, the fluid is water.

In this manner, the difference between the solubility parameter of the sealing material and the solubility parameter of the fluid flowing through the flow path is preferably 1 or greater. This can suppress the sealing material from dissolving in the fluid.

The sealing portion 130 includes the first reservoir portion 134a, the first plate-shaped portion 132a, the second reservoir portion 134b, the second plate-shaped portion 132b, the third reservoir portion 134c, the third plate-shaped portion 132c, and the fourth reservoir portion 134d.

The first reservoir portion 134a is formed in a gap between the side surface 110s2 of the body portion 110 and the part 120o2 of the pipe portion 120.

The first plate-shaped portion 132a is formed in a gap between the side surface 110s2 of the body portion 110 and the part 120o3 of the pipe portion 120.

The second reservoir portion 134b is formed in a gap between the part 110i8 of the body portion 110 and the parts 120o3 and 120o4 of the pipe portion 120.

The second plate-shaped portion 132b is formed in a gap between the part 110i7 of the body portion 110 and the part 120o4 of the pipe portion 120.

The third reservoir portion 134c is formed in a gap between the parts 110i6 and 110i7 of the body portion 110 and the part 120o5 of the pipe portion 120.

The third plate-shaped portion 132c is formed in a gap between the part 110i6 of the body portion 110 and the side surface 120s2 of the pipe portion 120.

The fourth reservoir portion 134d is formed in a gap between the part 110i5 of the body portion 110 and the side surface 120s2 of the pipe portion 120.

Typically, the width in the axial direction AD1 of the first reservoir portion 134a is larger than the width in the axial direction AD1 of the first plate-shaped portion 132a. This makes it possible to easily visually recognize that sealing is performed by the sealing portion 130 from the appearance of the connector 100.

The width in the axial direction AD1 of the fourth reservoir portion 134d is larger than the width in the axial direction AD1 of the third plate-shaped portion 132c. This can suppress the fluid from entering the gap between the sealing portion 130 and the opposing surface 110f of the body portion 110 and/or the gap between the sealing portion 130 and the opposing surface 120f of the pipe portion 120.

Furthermore, typically, the sectional area of the second reservoir portion 134b is larger than the sectional area of the third reservoir portion 134c. This can seal the body portion 110 and the pipe portion 120 more reliably, and can suppress inflow of the sealing material into the through hole 110p. For example, a sectional area obtained by cutting the second reservoir portion 134b along the Y direction is 0.10 mm$^2$, and a sectional area obtained by cutting the third reservoir portion 134c along the Y direction is 0.04 mm$^2$.

In the present example embodiment, the connector 100 is provided with a flow path extending in the axial direction AD1 along the central axis AX1. The connector 100 includes the body portion 110 having a through hole extending in the axial direction AD1, the pipe portion 120 having a through hole extending in the axial direction AD1, and the sealing portion 130 including a sealing material to seal between the body portion 110 and the pipe portion 120. The body portion 110 has the body portion-side opposing surface 110f opposing the pipe portion 120. The pipe portion 120 has the pipe portion-side opposing surface 120f opposing the body portion 110. The sealing portion 130 is positioned between the body portion-side opposing surface 110f and the pipe portion-side opposing surface 120f. The sealing portion 130 has the reservoir portion 134 in which the sealing material collects between the body portion-side opposing surface 110f and the pipe portion-side opposing surface 120f.

Since the sealing portion 130 has the reservoir portion 134 in which the sealing material sealing the body portion 110 and the pipe portion 120 collects between the body portion-side opposing surface 110f and the pipe portion-side opposing surface 120f, it is possible to sufficiently seal between the body portion 110 and the pipe portion 120 and it is possible to suppress fluid leakage from between the body portion 110 and the pipe portion 120.

The body portion-side opposing surface 110f and the pipe portion-side opposing surface 120f face each other in the radial direction RD1 orthogonal to the axial direction AD1 and the central axis AX1. This can suppress a foreign matter from being mixed into the body portion 110 and/or the pipe portion 120 from between the body portion 110 and the pipe portion 120.

The sealing portion 130 includes the first plate-shaped portion 132a positioned between the side surface 110s2 of the body portion 110 and the outer peripheral surface (the part 120o3) of the pipe portion 120 opposing in the axial direction AD1, the second plate-shaped portion 132b coupled to the first plate-shaped portion 132a and positioned between the inner peripheral surface (the part 110i7) of the body portion 110 and the outer peripheral surface (the part 120o4) of the pipe portion 120 opposing in the radial direction RD1, and the third plate-shaped portion 132c coupled to the second plate-shaped portion 132b and positioned between the inner peripheral surface (the part 110i6) of the body portion 110 and the side surface 120s2 of the pipe portion 120 opposing in the axial direction AD1. This can further suppress a foreign matter from being mixed into the body portion 110 and/or the pipe portion 120 from between the body portion 110 and the pipe portion 120.

At least one of the body portion-side opposing surface 110f and the pipe portion-side opposing surface 120f has the cutout surface (the parts 110i5, 110i8, 120o2, and 120o5) obtained by cutting out a plane parallel to the axial direction AD1 or the radial direction RD1. This makes it possible to easily form the reservoir portion (the first reservoir portion 134a to the fourth reservoir portion 134d) of the sealing material.

The sealing portion 130 has the plurality of reservoir portions (the first reservoir portion 134a to the fourth reservoir portion 134d) as reservoir portions. The plurality of reservoir portions include the outer diameter-side reservoir portion (the first reservoir portion 134a) positioned on the outermost side in the radial direction among the plurality of reservoir portions, and the inner diameter-side reservoir portion (the fourth reservoir portion 134d) positioned on the innermost side in the radial direction among the plurality of reservoir portions.

[0149-1]Here, as shown in FIG. 6, in the connector 100, the plurality of cutout surfaces (the parts 110i5, 110i8, 120o2, and 120o5) are located as cutout surfaces. The plurality of cutout surfaces include an outer diameter-side cutout surface (the part 120o2) and an inner diameter-side cutout surface (the part 110i5). The outer diameter-side cutout surface (the part 120o2) is a cutout surface positioned at the outer end portion in the radial direction of the pipe portion-side opposing surface 120f among the plurality of cutout surfaces. The inner diameter-side cutout surface (the part 110i5) is a cutout surface communicating with the through hole 110p among the plurality of cutout surfaces.

[0149-1-1]In a case where the outer diameter-side reservoir portion (the first reservoir portion 134a) and the inner diameter-side reservoir portion (the fourth reservoir portion 134d) are exposed in the radial direction RD1, the slant (slant angle θ1) with respect to the axial direction AD1 of the inner diameter-side cutout surface (the part 110i5) is smaller than the slant (slant angle θ2) with respect to the axial direction AD1 of the outer diameter-side cutout surface (the part 120o2). Therefore, in a case where the sealing portion 130 is formed, when the sealing material (adhesive) is held by capillary force, the sealing material (adhesive) and the elastic portion 150 can be suppressed from coming into contact with each other. That is, the inner diameter-side reservoir portion (the fourth reservoir portion 134d) can be suppressed from expanding in the radial direction RD1. Therefore, the sealing material of the inner diameter-side reservoir portion is suppressed from adhering to the elastic portion 150 and the like. In the example of FIG. 5, the outer diameter-side reservoir portion (the first reservoir portion 134a) is exposed outward in the radial direction. The inner diameter-side reservoir portion (the fourth reservoir portion 134d) is exposed inward in the radial direction.

[0149-3]Since the outer diameter-side cutout surface (the part 120o2) and the inner diameter-side cutout surface (the part 110i5) are configured as described above, a slant (a slant angle θ11) with respect to the axial direction AD1 of the inner diameter-side reservoir portion (the fourth reservoir portion 134d) is smaller than a slant (a slant angle θ21) with respect to the axial direction AD1 of the outer diameter-side reservoir portion (the first reservoir portion 134a). Note that in FIG. 5, the inner diameter-side reservoir portion (the fourth reservoir portion 134d) and the outer diameter-side reservoir portion (the first reservoir portion 134a) are schematically shown in a triangular shape, but are actually curved as shown in circles C10 and C20. In detail, as shown in the circles C10 and C20, since the sealing portion 130 is held using the surface tension and the atmospheric pressure, the curvatures of the inner diameter-side reservoir portion (the fourth reservoir portion 134d) and the outer diameter-side reservoir portion (the first reservoir portion 134a) become substantially equal. Therefore, by reducing the slant angle θ1 (FIG. 6), it is possible to suppress expansion in the radial direction RD1 of the sealing material (adhesive) constituting the sealing portion 130.

The sealing portion 130 has the plate-shaped portion (the second plate-shaped portion 132b) positioned between the inner peripheral surface (the part 110i7) of the body portion 110 and the outer peripheral surface (the part 120o4) of the pipe portion 120 opposing each other in the radial direction RD1. The reservoir portion 134 includes at least one of the reservoir portion (the second reservoir portion 134b) positioned on one axial side (−Y direction) of this plate-shaped portion (the second plate-shaped portion 132b) and the reservoir portion (the third reservoir portion 134c) positioned on the axial other side (+Y direction) of the plate-shaped portion (the second plate-shaped portion 132b). This makes it possible to easily form the reservoir portion (the second reservoir portion 134b and/or the third reservoir portion 134c) at the end portion of the second plate-shaped portion 132b extending in the axial direction AD1 in the sealing portion 130.

The sealing portion 130 has the plate-shaped portion (the second plate-shaped portion 132b) positioned between the inner peripheral surface (the part 110i7) of the body portion 110 and the outer peripheral surface (the part 120o4) of the pipe portion 120 opposing each other in the radial direction RD1. The reservoir portion 134 includes the one axial side reservoir portion (the second reservoir portion 134b) positioned on one axial side (−Y direction) of this plate-shaped portion (the second plate-shaped portion 132b) and the axial other side reservoir portion (the third reservoir portion 134c) positioned on the axial other side (+Y direction) of this plate-shaped portion (the second plate-shaped portion 132b). The sectional area of the one axial side reservoir portion (the second reservoir portion 134b) is larger than the sectional area of the axial other side reservoir portion (the third reservoir portion 134c). In this manner, it is possible to easily fill the sealing material by providing a reservoir portion having a large sectional area, and at the same time, it is possible to reduce the amount of a necessary sealing material by providing a reservoir portion having a small sectional area.

The connector 100 of the present example embodiment further includes the elastic portion 150 located in the flow path, and a valve portion (the moving member 160) that is located in the through hole 110p and moves in the axial direction AD1 in accordance with the elastic portion 150 in contact with the elastic portion 150. The reservoir portion 134 is positioned outside in the radial direction relative to the elastic portion 150 and the valve portion. This can suppress the sealing portion 130 from coming into contact with the elastic portion 150 and the valve portion.

In the present example embodiment, the valve portion (the moving member 160) closes the opening portion of the body portion 110. This makes it possible to use the connector 100 as a plug.

[0154-1]Note that in FIG. 6, the sealing portion 130 is configured as a single member. However, the sealing portion 130 may include a plurality of members. For example, the sealing portion 130 need not have all or some of the first plate-shaped portion 132a, the second plate-shaped portion 132b, and the third plate-shaped portion 132c. For example, in the sealing portion 130, all of the first reservoir portion 134a, the second reservoir portion 134b, the third reservoir portion 134c, and the fourth reservoir portion 134d need not be coupled, and all or some of the first reservoir portion 134a, the second reservoir portion 134b, the third reservoir portion 134c, and the fourth reservoir portion 134d may be separated.

[0154-2]In FIG. 6, the outer diameter-side cutout surface (the part 120o2) is a cutout surface positioned at the outer end portion in the radial direction of the pipe portion-side opposing surface 120f, and the inner diameter-side cutout surface (the part 110i5) is a cutout surface communicating with the through hole 110p. However, the outer diameter-side cutout surface may be a cutout surface (part) positioned at the outer end portion in the radial direction of the body portion-side opposing surface 110f, and the inner diameter-side cutout surface may be a cutout surface (part) communicating with the through hole 120p.

[0154-3]Note that when the outer diameter-side reservoir portion and the inner diameter-side reservoir portion are exposed in the axial direction AD1, the slant (slant angle) with respect to the radial direction RD1 of the inner diameter-side cutout surface is smaller than the slant (slant angle) with respect to the radial direction RD1 of the outer diameter-side cutout surface.

Figure 7A:
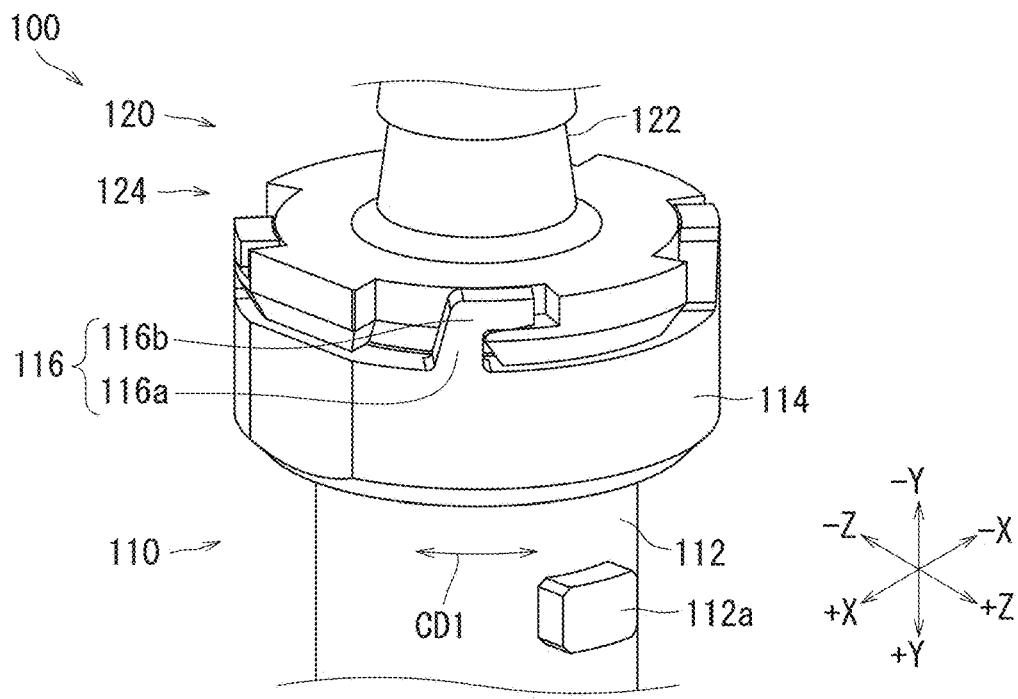
FIG. 7A is a partially enlarged perspective view of the connector of FIG. 1.
Figure 7B:
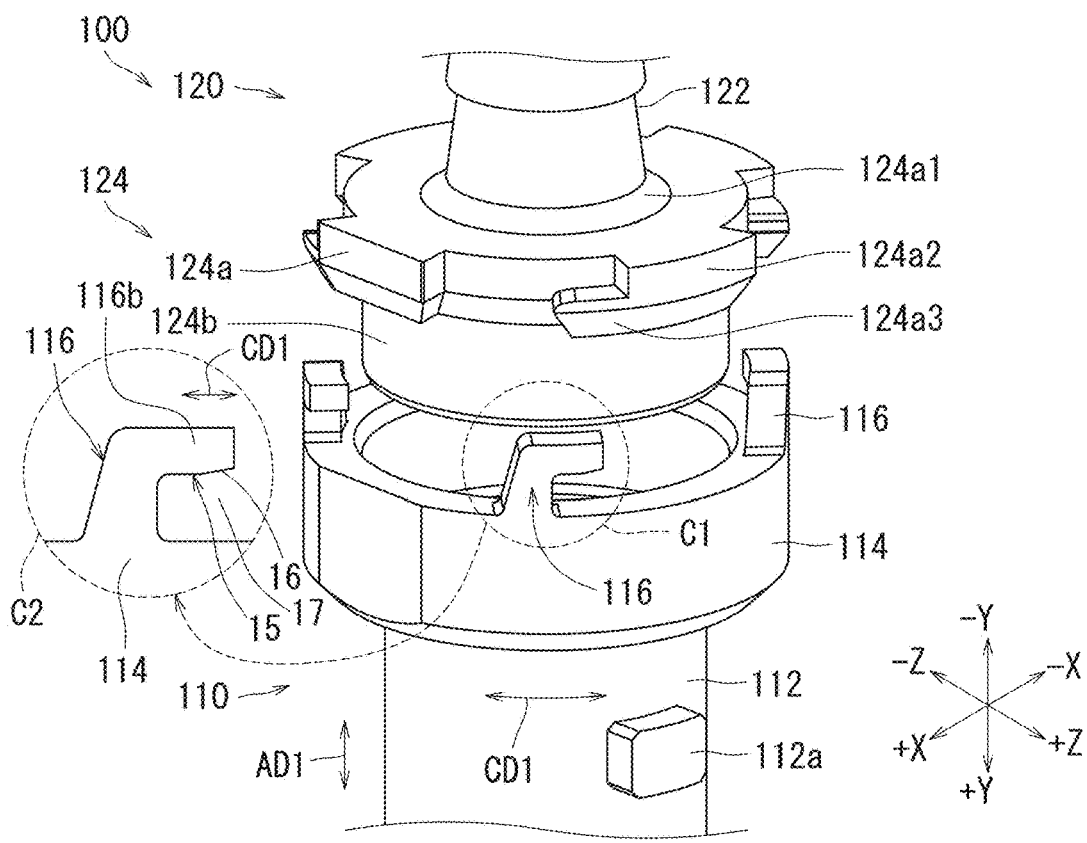
FIG. 7B is a partially enlarged exploded perspective view of the connector of FIG. 1.

Next, the connector 100 according to the present example embodiment will be described with reference to FIGS. 1 to 7B. FIG. 7A is a partially enlarged perspective view of the connector 100 of FIG. 1, and FIG. 7B is a partially enlarged exploded perspective view of the connector 100 of FIG. 1. Note that in FIGS. 7A and 7B, the sealing portion 130 will be omitted in order to avoid the drawing from being excessively complicated.

As shown in FIGS. 7A and 7B, the body portion 110 includes the tube portion 112, the attachment portion 114, and the claw portion 116.

The claw portion 116 has a first part 116a extending in the axial direction AD1 from the end portion of the body portion 110 and a second part 116b extending in the circumferential direction from the end portion of the first part 116a.

The pipe portion 120 has the tube portion 122 and the attachment portion 124. The attachment portion 124 has the base portion 124a coupled to the tube portion 122 and the projection portion 124b coupled to the base portion 124a and positioned on the +Y direction side. The base portion 124a has a partially different outer diameter in the radial direction RD1, and the projection portion 124b is cylindrical. The base portion 124a has a central portion 124a1, an expansion portion 124a2 coupled to the central portion 124a1 and partially extending in the radial direction RD1 from the outer diameter of the central portion 124a1, and a projection portion 124a3 extending in the circumferential direction from the expansion portion 124a2. The expansion portion 124a2 extends in the radial direction RD1 from the central portion 124a1 in four directions orthogonal to one another. The projection portion 124a3 extends from the +Y direction side to one side on the circumferential direction on one side on the circumferential direction of the expansion portion 124a2. The projection portion 124a3 is an example of a holding mechanism.

As understood from FIGS. 7A and 7B, the claw portion 116 of the body portion 110 is inserted from between adjacent two expansion portions 124a2 of the pipe portion 120. Thereafter, the pipe portion 120 is rotated to one side in the circumferential direction with respect to the body portion 110, whereby the claw portion 116 of the body portion 110 is press-fitted into the projection portion 124a3 of the pipe portion 120. This can effectively hold the positions of the body portion 110 and the pipe portion 120.

The length in the axial direction AD1 of the claw portion 116 of the body portion 110 is substantially equal to the length in the axial direction AD1 of the base portion 124a of the pipe portion 120. The length in the axial direction AD1 of the first part 116a is substantially equal to the length in the axial direction AD1 of the projection portion 124a3. This allows the claw portion 116 of the body portion 110 to be relatively quickly press-fitted into the projection portion 124a3 of the pipe portion 120, allows the claw portion 116 of the body portion 110 to be suppressed from projecting from the attachment portion 124 of the pipe portion 120, and allows the claw portion 116 to be suppressed from colliding with an unintended member.

The claw portion 116 has the second part 116b extending in the circumferential direction CD1. Therefore, after the claw portion 116 of the body portion 110 is inserted from between the adjacent two expansion portions 124a2 of the pipe portion 120, the body portion 110 is rotated in the circumferential direction CD1 to press-fit the second part 116b of the claw portion 116 into the projection portion 124a3 of the pipe portion 120. This can strongly attach the body portion 110 to the pipe portion 120 even when the elastic portion 150 strongly presses the pipe portion 120.

[0161-1]In FIG. 7B, the claw portion 116 in the circle C2 shows a state in which the claw portion 116 in the circle C1 is viewed from the radial direction RD1. The second part 116b has an opposing surface 15 opposing in the axial direction AD1 with respect to the attachment portion 114. The opposing surface 15 extends in the circumferential direction CD1. The opposing surface 15 includes a slant surface 16. The slant surface 16 is slanting with respect to the circumferential direction CD1 so as to be away in the axial direction AD1 from the attachment portion 114. Therefore, the claw portion 116 can be easily press-fitted into the projection portion 124a3 of the pipe portion 120. In other words, the projection portion 124a3 can be easily press-fitted into a gap 17 between the opposing surface 15 and the attachment portion 114.

Note that in the above description, the claw portion 116 is provided in the body portion 110, but the present example embodiment is not limited to this. The claw portion may be provided on the pipe portion 120.

In the above description, the claw portion 116 and the projection portion 124a3 have been described as an example of the holding mechanism holding the positions of the body portion 110 and the pipe portion 120, but the present example embodiment is not limited to this. The holding mechanism may include a fixing pin fixing the position of the pipe portion 120 with respect to the body portion 110 after a part of the pipe portion 120 is inserted into the body portion 110.

In this case, the holding mechanism includes a plurality of pins parallel to the Z direction and a plurality of pins parallel to the Y direction. After the part of the pipe portion 120 is inserted into the body portion 110, each of these pins is inserted so as to pass through between wall portions of the pipe portion 120 in the body portion 110 and penetrate the pipe portion 120. Due to this, the position of the pipe portion 120 with respect to the body portion 110 may be defined, and the positions of the pipe portion 120 and the body portion 110 may be held.

Alternatively, the holding mechanism may have a protrusion part filling between the claw portion 116 of the body portion 110 and the expansion portion 124a2 of the pipe portion 120, and a base member holding the protrusion part. Alternatively, the holding mechanism may include a clamp fixing the attachment portion 114 of the body portion 110 and the attachment portion 124 of the pipe portion 120 in the axial direction.

In this manner, the connector 100 of the present example embodiment further includes the holding mechanism holding the positions of the body portion 110 and the pipe portion 120. The sealing portion 130 can sufficiently seal between the body portion 110 and the pipe portion 120 by the holding mechanism holding the positions of the body portion 110 and the pipe portion 120. The holding mechanism suppresses the body portion 110 and the pipe portion 120 from being twisted by an external force, and makes the sealing portion 130 (sealing material) hardly removed.

The holding mechanism may have a claw portion extending from one member of the body portion 110 and the pipe portion 120 and hooking on the other member of the body portion 110 and the pipe portion 120. The claw portion has a first part extending in the axial direction AD1 from one member and a second part extending in the circumferential direction CD1 from the tip end of the first part, and the second part opposes the other member in the axial direction. For example, the holding mechanism may have the claw portion 116 extending from the body portion 110 and hooking on the pipe portion 120. The claw portion 116 has the first part 116a extending in the axial direction AD1 from the body portion 110 and the second part 116b extending in the circumferential direction from the tip end of the first part 116a, and the second part 116b opposes the pipe portion 120 in the axial direction AD1. The claw portion 116 can suppress movement in the circumferential direction CD1 and the axial direction AD1 with a simple structure.

The connector 100 functioning as a so-called plug has been described with reference to FIGS. 1 to 7B, but the present example embodiment is not limited to this. The connector may function as a so-called socket.

Hereinafter, the connector 200 according to the present example embodiment will be described with reference to FIGS. 8 to 14B. Typically, a tube through which a fluid flows is attached to the connector 200. The connector 200 can be closed so that the fluid flowing through the tube does not flow out. The connector 200 can be configured such that the fluid flowing through the tube flows out in combination with another member. The connector 200 functions as a so-called socket.

Figure 8:
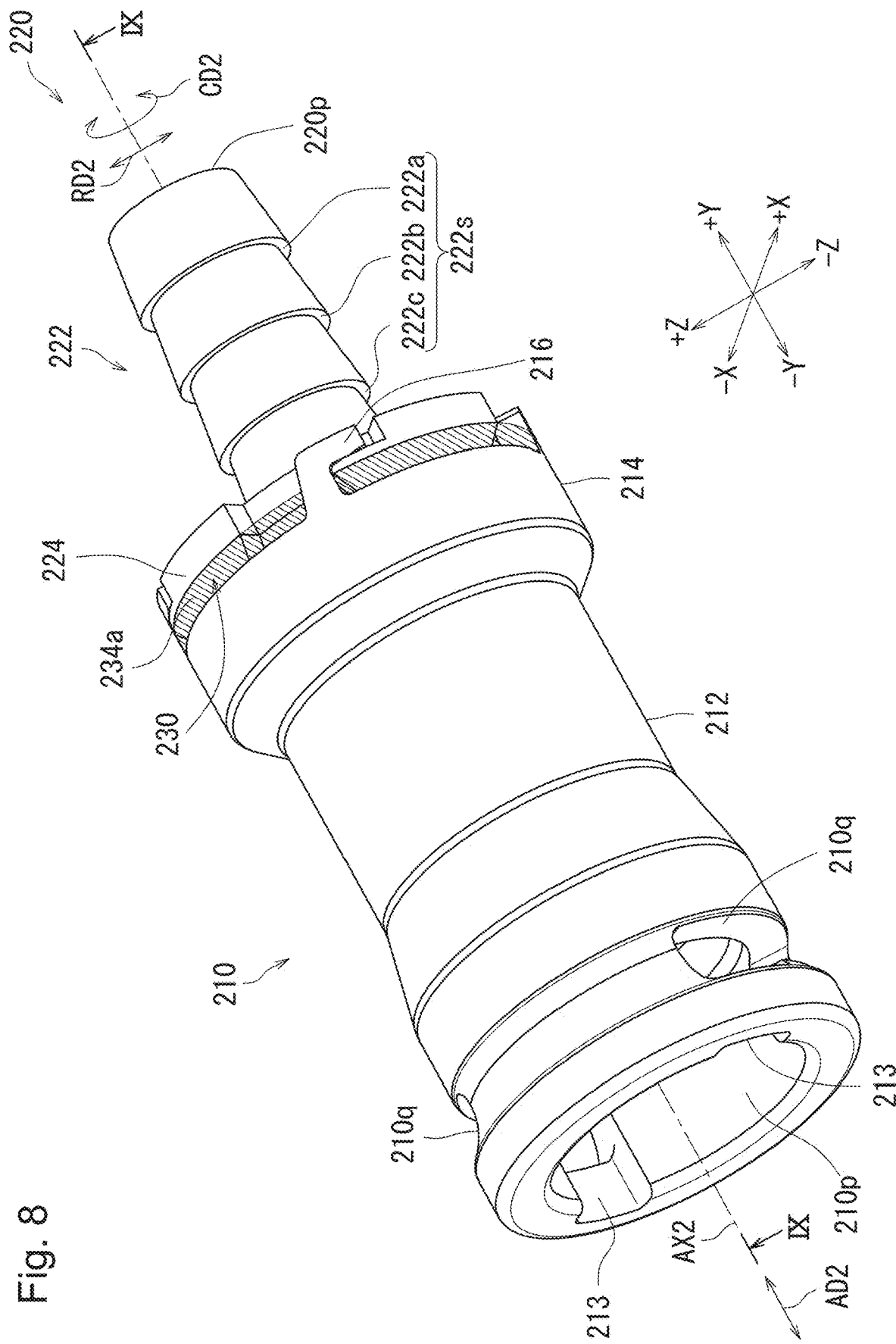
FIG. 8 is a perspective view of the connector according to the present example embodiment.

First, the connector 200 according to the present example embodiment will be described with reference to FIG. 8. FIG. 8 is a perspective view of the connector 200 according to the present example embodiment.

As shown in FIG. 8, the connector 200 includes a body portion 210, a pipe portion 220, and a sealing portion 230. The body portion 210 is positioned on the −Y direction side with respect to the pipe portion 220. The sealing portion 230 seals between the body portion 210 and the pipe portion 220.

The body portion 210 has a through hole 210p. The through hole 210p extends along the axial direction AD2. For example, the body portion 210 is made of resin.

The body portion 210 has a through hole 210q. The through hole 210q penetrates the body portion 210 in the radial direction RD2. The body portion 210 has a pair of recess portions 213. The recess portion 213 extends in the axial direction AD2. The recess portion 213 is recessed outward in the radial direction.

The pipe portion 220 has a through hole 220p. The through hole 220p is coupled to the through hole 210p. The through hole 220p extends along the axial direction AD2. For example, the pipe portion 220 is made of resin.

The sealing portion 230 is positioned between the body portion 210 and the pipe portion 220. A tube through which a fluid flows is mounted to the pipe portion 220. The sealing portion 230 seals between the body portion 210 and the pipe portion 220. This can suppress the fluid flowing through the tube from flowing out from between the body portion 210 and the pipe portion 220.

The body portion 210 includes a tube portion 212 and an attachment portion 214. The attachment portion 214 is coupled in the axial direction AD2 to a tube portion 222. The tube portion 212 has a through hole extending along the axial direction AD2. The attachment portion 214 has a through hole communicating with the through hole of the tube portion 212. The pipe portion 220 is attached to the attachment portion 214.

The attachment portion 214 is substantially tubular. The outer diameter of the outer peripheral surface of the attachment portion 214 is larger than the outer diameter of the outer peripheral surface of the tube portion 212.

The pipe portion 220 has the tube portion 222 and an attachment portion 224. The attachment portion 224 is coupled in the axial direction AD2 with respect to the tube portion 222. The tube portion 222 has a through hole extending along the axial direction AD2. The attachment portion 224 has a through hole communicating with the through hole of the tube portion 222. The attachment portion 224 is positioned on the −Y direction side with respect to the tube portion 222. The body portion 210 is attached to the attachment portion 224.

Typically, a tube through which a fluid flows is attached to the tube portion 222. The fluid flowing through the tube enters the through hole 210p of the body portion 210 from the through hole 220p of the pipe portion 220.

The outer peripheral surface of the tube portion 222 is provided with a stepped portion 222s. Here, the stepped portion 222s expands in the circumferential direction on the outer peripheral surface of the tube portion 222 when viewed from the axial direction AD2. The stepped portion 222s is substantially circular and extends in the circumferential direction. The stepped portion 222s is provided at each of three locations on the outer peripheral surface of the tube portion 222. The stepped portion 222s includes a stepped portion 222a positioned on the +Y direction side of the outer peripheral surface of the tube portion 222, a stepped portion 222b positioned on the −Y direction side with respect to the stepped portion 222a, and a stepped portion 222c positioned on the −Y direction side with respect to the stepped portion 222b. Each of the stepped portions 222a to 222c extends in the circumferential direction. The stepped portion 222s can suppress the tube from being easily removed from the tube portion 222.

The attachment portion 224 is substantially tubular. The outer diameter of the outer peripheral surface of the attachment portion 224 is larger than the outer diameter of the outer peripheral surface of the tube portion 222.

For example, the sealing portion 230 bonds the body portion 210 and the pipe portion 220. The sealing portion 230 can suppress the fluid from flowing out to the outside from between the body portion 210 and the pipe portion 220.

The body portion 210 is provided with a claw portion 216. The claw portion 216 extends in the +Y direction from the attachment portion 214. The claw portion 216 is positioned in the +Y direction from the attachment portion 214. The claw portion 216 extends in the −Y direction from the attachment portion 214 and extends to one side in the circumferential direction at a tip end thereof. The claw portion 216 is hooked on the attachment portion 224 of the pipe portion 220. The claw portion 216 holds the positions of the body portion 210 and the pipe portion 220. The claw portion 216 is an example of a holding mechanism.

Figure 9:
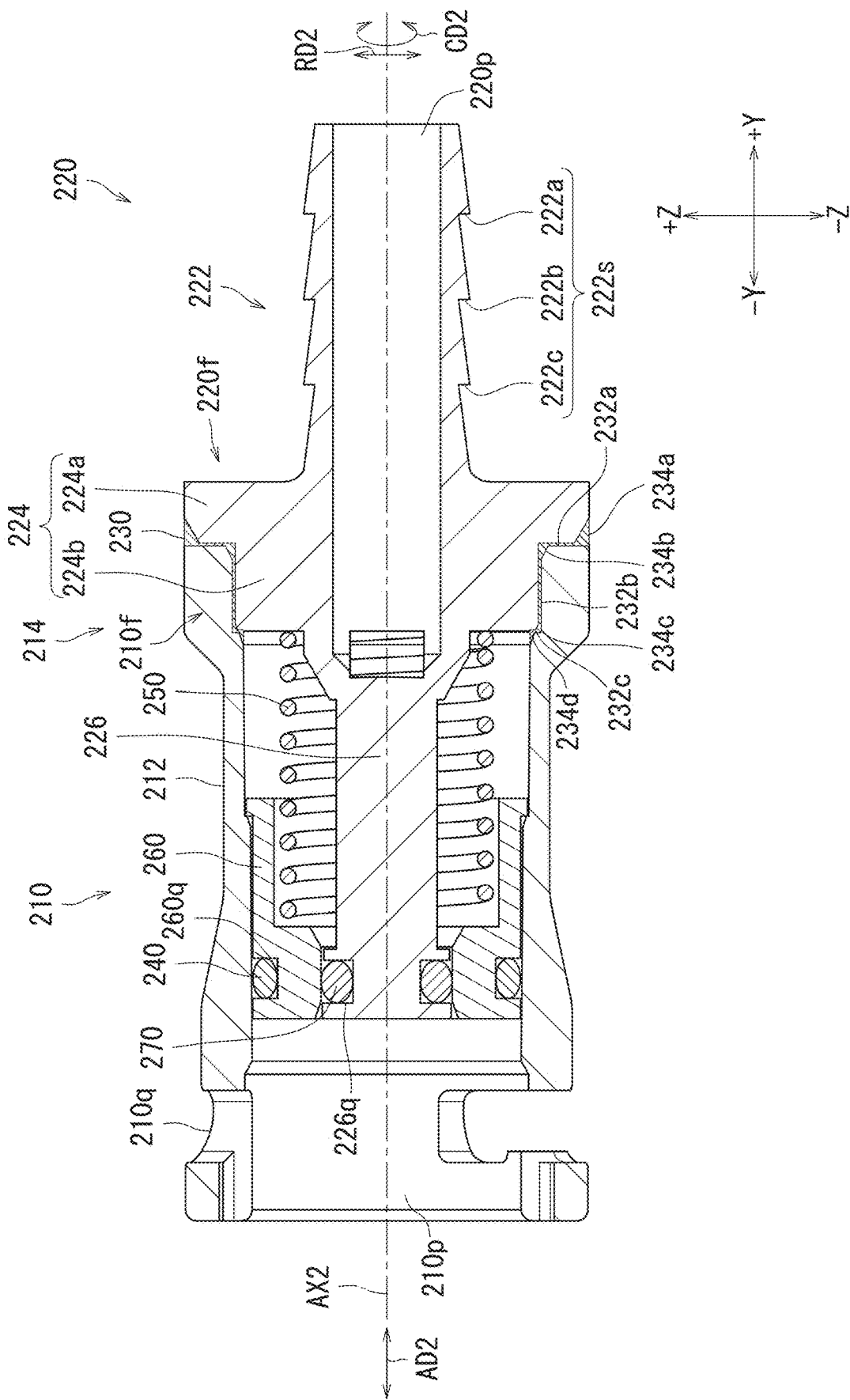
FIG. 9 is a sectional view taken along line IX-IX of FIG. 8.
Figure 10:
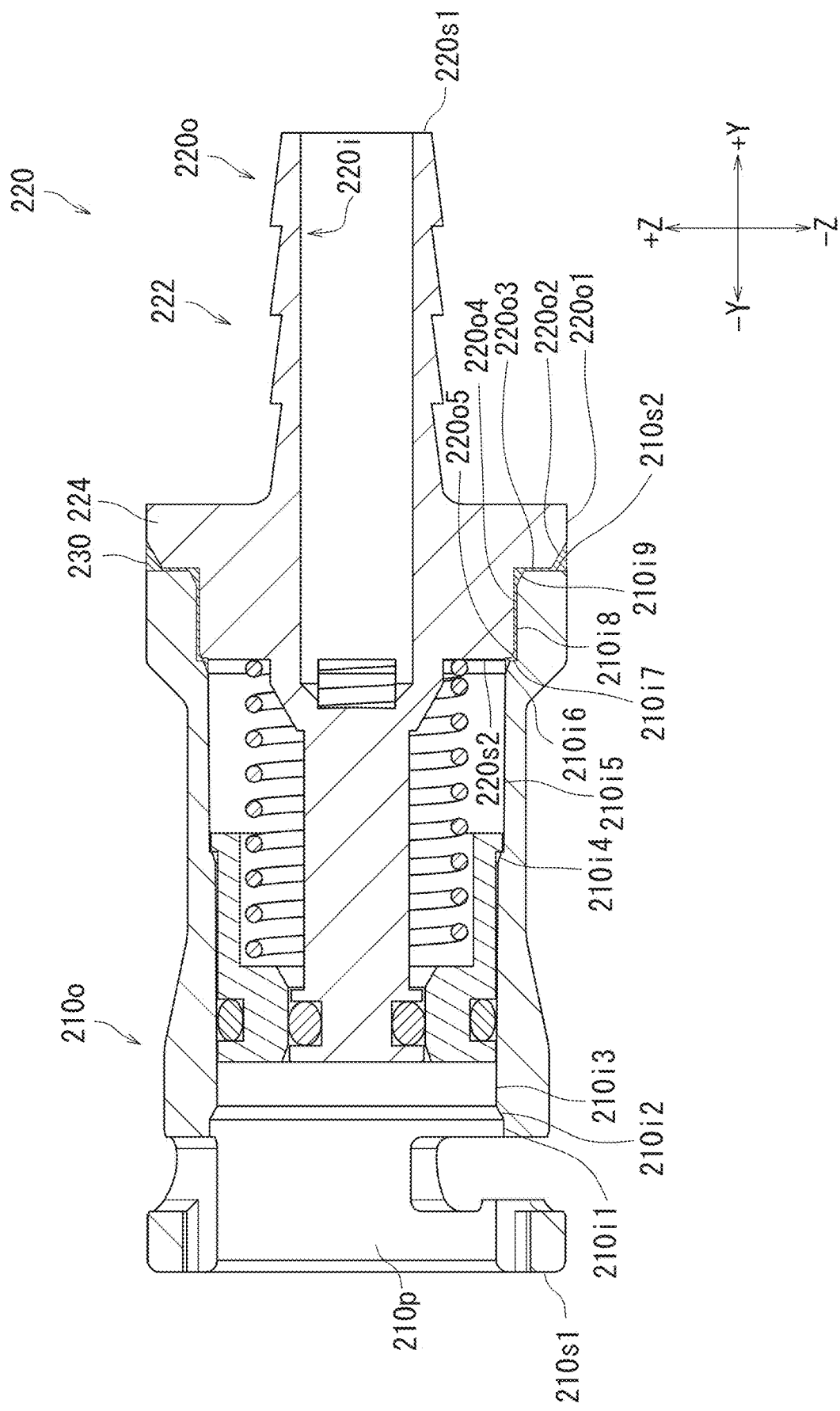
FIG. 10 is a sectional view taken along line IX-IX of FIG. 8.

Next, the connector 200 according to the present example embodiment will be described with reference to FIGS. 8 to 10. FIGS. 9 and 10 are sectional views taken along line IX-IX of FIG. 8.

As shown in FIGS. 9 and 10, the connector 200 further includes a hermetic member 240, an elastic portion 250, a moving member 260, and a hermetic member 270 in addition to the body portion 210, the pipe portion 220, and the sealing portion 230.

The body portion 210 extends in the axial direction AD2. The through hole 210p of the body portion 210 extends in the axial direction AD2.

The pipe portion 220 extends in the axial direction AD2. The through hole 220p of the pipe portion 220 extends in the axial direction AD2.

The central axis AX2 of the connector 200 passes through the through hole 210p of the body portion 210 and the through hole 220p of the pipe portion 220.

The pipe portion 220 is partially accommodated in the body portion 210. A part of the pipe portion 220 is located in the through hole 210p of the body portion 210. The through hole 220p of the pipe portion 220 communicates with the through hole 210p of the body portion 210.

The body portion 210 has an opposing surface 210f opposing the pipe portion 220. The pipe portion 220 has an opposing surface 220f opposing the body portion 210. The opposing surface 210f of the body portion 210 and the opposing surface 220f of the pipe portion 220 face each other. The opposing surface 210f of the body portion 210 is an example of a body portion-side opposing surface, and the opposing surface 220f of the pipe portion 220 is an example of a pipe portion-side opposing surface.

The sealing portion 230 is positioned between the body portion 210 and the pipe portion 220. The sealing portion 230 is positioned between the opposing surface 210f of the body portion 210 and the opposing surface 220f of the pipe portion 220. The sealing portion 230 seals between the opposing surface 210f of the body portion 210 and the opposing surface 220f of the pipe portion 220. This can suppress the fluid flowing through the tube from flowing out from between the body portion 210 and the pipe portion 220.

The body portion 210 includes the tube portion 212 and the attachment portion 214. The attachment portion 214 is positioned in the +Y direction with respect to the tube portion 212. The attachment portion 214 is coupled in the axial direction AD2 with respect to the tube portion 212. The outer diameter (length in the radial direction) of the attachment portion 214 is larger than the outer diameter (length in the radial direction) of the tube portion 212.

The body portion 210 has a substantially cylindrical shape. The body portion 210 has an outer peripheral surface 210o, an inner peripheral surface 210i, a side surface 210s1, and a side surface 210s2. The side surface 210s1 is positioned in the −Y direction, and the side surface 210s2 is positioned in the +Y direction.

The inner peripheral surface 210i includes a part 210i1, a part 210i2, a part 210i3, a part 210i4, a part 210i5, a part 210i6, a part 210i7, a part 210i8, and a part 210i9.

The part 210i1 connects the side surface 210s1 and the part 210i2. The part 210i1 extends in the axial direction AD2. The part 210i1 is a part of the inner peripheral surface of the tube portion 212.

The part 210i2 connects the part 210i1 and the part 210i3. The inner diameter of the part 210i2 decreases toward the +Y direction. The part 210i2 is a part of the inner peripheral surface of the tube portion 212.

The part 210i3 connects the part 210i2 and the part 210i4. The inner diameter of the part 210i3 extends in the axial direction AD2. The part 210i3 is a part of the inner peripheral surface of the tube portion 212.

The part 210i4 connects the part 210i3 and the part 210i5. The part 210i4 extends in the radial direction RD2. The part 210i4 is a part of the inner peripheral surface of the tube portion 212.

The part 210i5 connects the part 210i4 and the part 210i6. The part 210i5 extends in the axial direction AD2. The part 210i5 is a part of the inner peripheral surface of the tube portion 212 and a part of the inner peripheral surface of the attachment portion 214.

The part 210i6 connects the part 210i5 and the part 210i7. The inner diameter of the part 210i6 increases toward the +Y direction. The part 210i6 is a part of the inner peripheral surface of the attachment portion 214.

The part 210i7 connects the part 210i6 and the part 210i8. The part 210i7 extends in the radial direction RD2. The part 210i7 is a part of the inner peripheral surface of the attachment portion 214.

The part 210i8 connects the part 210i7 and the part 210i9. The part 210i8 extends in the axial direction AD2. The part 210i8 is a part of the inner peripheral surface of the attachment portion 214.

The part 210i9 connects the part 210i8 and the side surface 210s2. The inner diameter of the part 210i9 increases toward the +Y direction. The part 210i9 is a part of the inner peripheral surface of the attachment portion 214.

The opposing surface 210f of the body portion 210 includes a part of the inner peripheral surface 210i and the side surface 210s2. Here, the opposing surface 210f of the body portion 210 includes a part of the part 210i6 of the inner peripheral surface 210i, the parts 210i7 to 210i9, and the side surface 210s2.

The pipe portion 220 has the tube portion 222 and the attachment portion 224. The attachment portion 224 is coupled in the axial direction AD2 with respect to the tube portion 222.

The attachment portion 224 has a base portion 224a, a projection portion 224b, and a column portion 226. Each of the base portion 224a and the projection portion 224b is substantially tubular. The base portion 224a is positioned between the tube portion 222 and the projection portion 224b. The inner diameter of the base portion 224a is substantially equal to the inner diameter of the projection portion 224b. The outer diameter of the projection portion 224b is smaller than the outer diameter of the base portion 224a.

The column portion 226 is coupled in the axial direction AD2 from the projection portion 224b. The column portion 226 extends in the −Y direction from the projection portion 224b.

The pipe portion 220 has a substantially cylindrical shape. The pipe portion 220 has an outer peripheral surface 220o, an inner peripheral surface 220i, a side surface 220s1, and a side surface 220s2. The side surface 220s1 is positioned in the +Y direction, and the side surface 220s2 is positioned in the −Y direction.

The inner peripheral surface 220i connects the side surface 220s1 and the side surface 220s2. The inner peripheral surface 220i extends in the axial direction AD2. The inner diameter of the inner peripheral surface 220i is substantially constant. The inner peripheral surface 220i includes the inner peripheral surface of the tube portion 222 and the inner peripheral surface of the attachment portion 224.

The outer peripheral surface 220o has a part 220o1, a part 220o2, a part 220o3, a part 220o4, and a part 220o5.

The part 220o1 is positioned outside in the radial direction of the attachment portion 224. The part 220o1 is connected to the part 220o2. The part 220o1 extends in the axial direction AD2. The outer diameter of the part 220o1 is substantially constant. The part 220o1 is a part of the outer peripheral surface of the attachment portion 224.

The part 220o2 connects the part 220o1 and the part 220o3. The part 220o2 extends obliquely with respect to the axial direction AD2. The outer diameter of the part 220o2 decreases toward the −Y direction. The part 220o2 is a part of the outer peripheral surface of the attachment portion 224.

The part 220o3 connects the part 220o2 and the part 220o4. The part 220o3 extends in the radial direction RD2. The part 220o3 is a part of the outer peripheral surface of the attachment portion 224.

The part 220o4 connects the part 220o3 and the part 220o5. The part 220o4 extends in the axial direction AD2. The part 220o4 is a part of the outer peripheral surface of the attachment portion 224.

The part 220o5 connects the part 220o4 and the side surface 220s2. The part 220o5 extends obliquely with respect to the axial direction AD2. The outer diameter of the part 220o5 decreases toward the −Y direction. The part 220o5 is a part of the outer peripheral surface of the attachment portion 224.

The opposing surface 220f of the pipe portion 220 includes a part of the outer peripheral surface 220o and a part of the side surface 220s2. Here, the opposing surface 220f of the pipe portion 220 includes the parts 220o2 to 220o5 of the outer peripheral surface 220o and a part of the side surface 220s2.

The hermetic member 240, the elastic portion 250, the moving member 260, and the hermetic member 270 are accommodated in the through hole 210p of the body portion 210 and the through hole 220p of the pipe portion 220.

The hermetic member 240 is located in the groove 260q of the moving member 260. The groove 260q extends in the circumferential direction. The hermetic member 240 hermetically seals between the body portion 210 and the moving member 260. For example, the hermetic member 240 is an annular elastic body. In one example, the hermetic member 240 is an O-ring.

The elastic portion 250 extends in the axial direction AD2. The −Y direction side end portion of the elastic portion 250 opposes the moving member 260. The +Y direction side end portion of the elastic portion 250 opposes the side surface 220s2 of the pipe portion 220. For example, the elastic portion 250 is a spring. In one example, the elastic portion 250 is a coil spring.

The moving member 260 is positioned on the −Y direction side with respect to the elastic portion 250. The moving member 260 comes into contact with the elastic portion 250 and moves with respect to the body portion 210 in accordance with the motion of the elastic portion 250. The moving member 260 is movable in the axial direction AD2 with respect to the body portion 210. The moving member 260 moves in the −Y direction with respect to the body portion 210, whereby the flow path of the connector 200 is opened. The moving member 260 moves in the −Y direction with respect to the body portion 210 and the moving member 260 comes into contact with the column portion 226, thereby closing the flow path of the connector 200. The moving member 260 is an example of a valve portion.

The outer diameter (length in the radial direction RD2) of the moving member 260 is substantially equal to the inner diameter of the part 210i5 of the inner peripheral surface 210i or slightly smaller than the inner diameter of the part 210i5. The outer diameter of the moving member 260 is larger than the inner diameter of the part 210i3 of the inner peripheral surface 210i. The inner diameter of the moving member 260 is larger than the outer diameter of the elastic portion 250.

The hermetic member 270 is located in the groove 226q of the column portion 226. The groove 226q extends in the circumferential direction. The hermetic member 270 hermetically seals between the column portion 226 and the moving member 260. For example, the hermetic member 270 is an annular elastic body. In one example, the hermetic member 270 is an O-ring.

Figure 11:
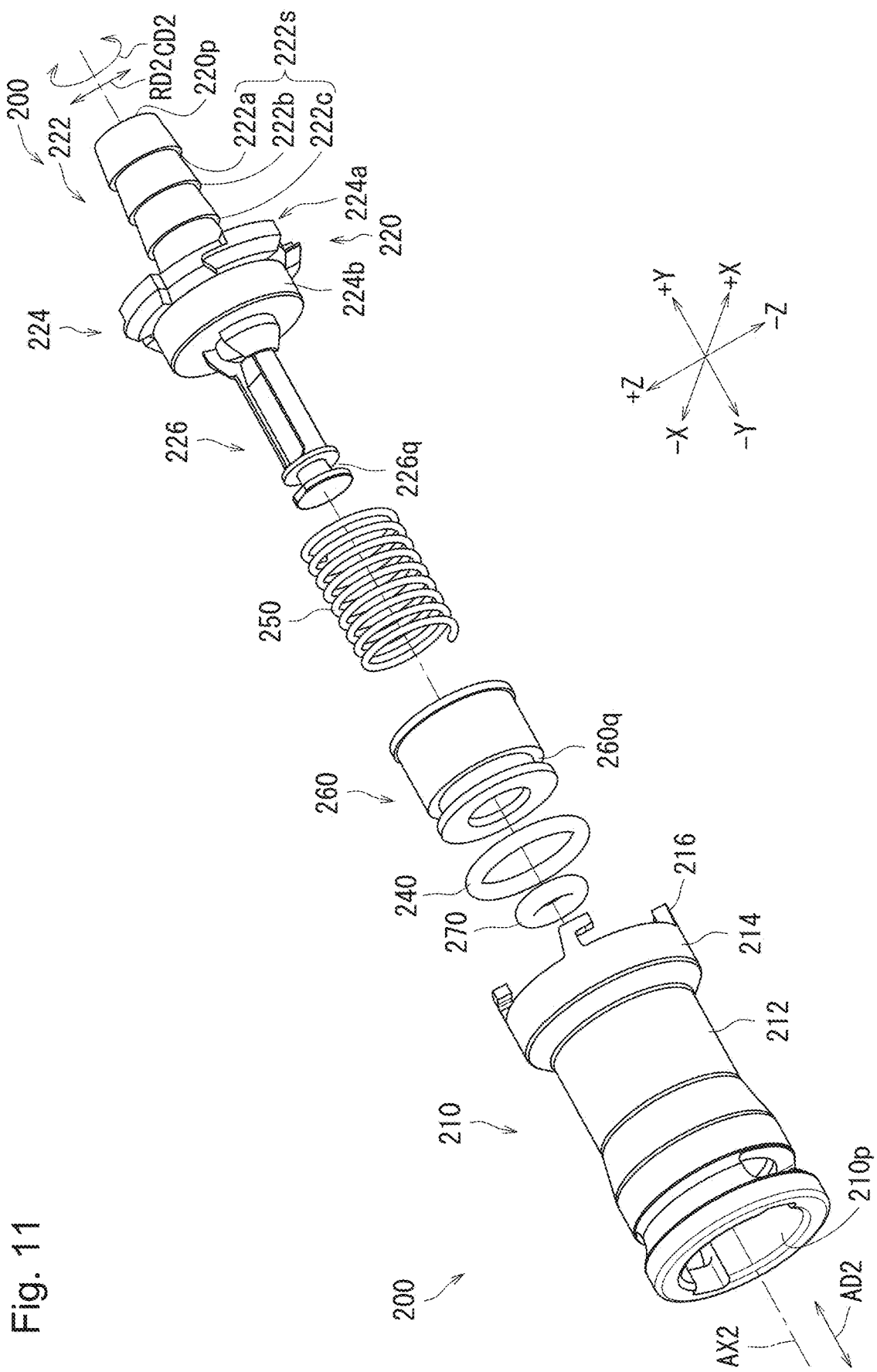
FIG. 11 is an exploded perspective view of the connector of FIG. 8.

Next, the connector 200 according to the present example embodiment will be described with reference to FIGS. 8 to 11. FIG. 11 is an exploded perspective view of the connector 200 of FIG. 8. Note that in FIG. 11, the sealing portion 230 will be omitted in order to avoid the drawing from being excessively complicated.

As shown in FIG. 11, in the connector 200, the body portion 210, the pipe portion 220, the hermetic member 240, the elastic portion 250, the moving member 260, and the hermetic member 270 are arrayed along the central axis AX2. The through hole 220p of the pipe portion 220 is connected to the through hole 210p of the body portion 210. The elastic portion 250, the moving member 260, and the hermetic member 270 are accommodated in the through hole 220p of the pipe portion 220.

The hermetic member 240 is located in the groove 260q of the moving member 260. The hermetic member 240 is positioned in the circumferential direction at the end portion on the −Y direction side of the moving member 260.

The elastic portion 250 and the moving member 260 are located in the through hole 210p of the body portion 210.

The hermetic member 270 is located in the groove 226q of the pipe portion 220. The hermetic member 270 is positioned in the circumferential direction at the end portion on the −Y direction side of the pipe portion 220.

Figure 12:
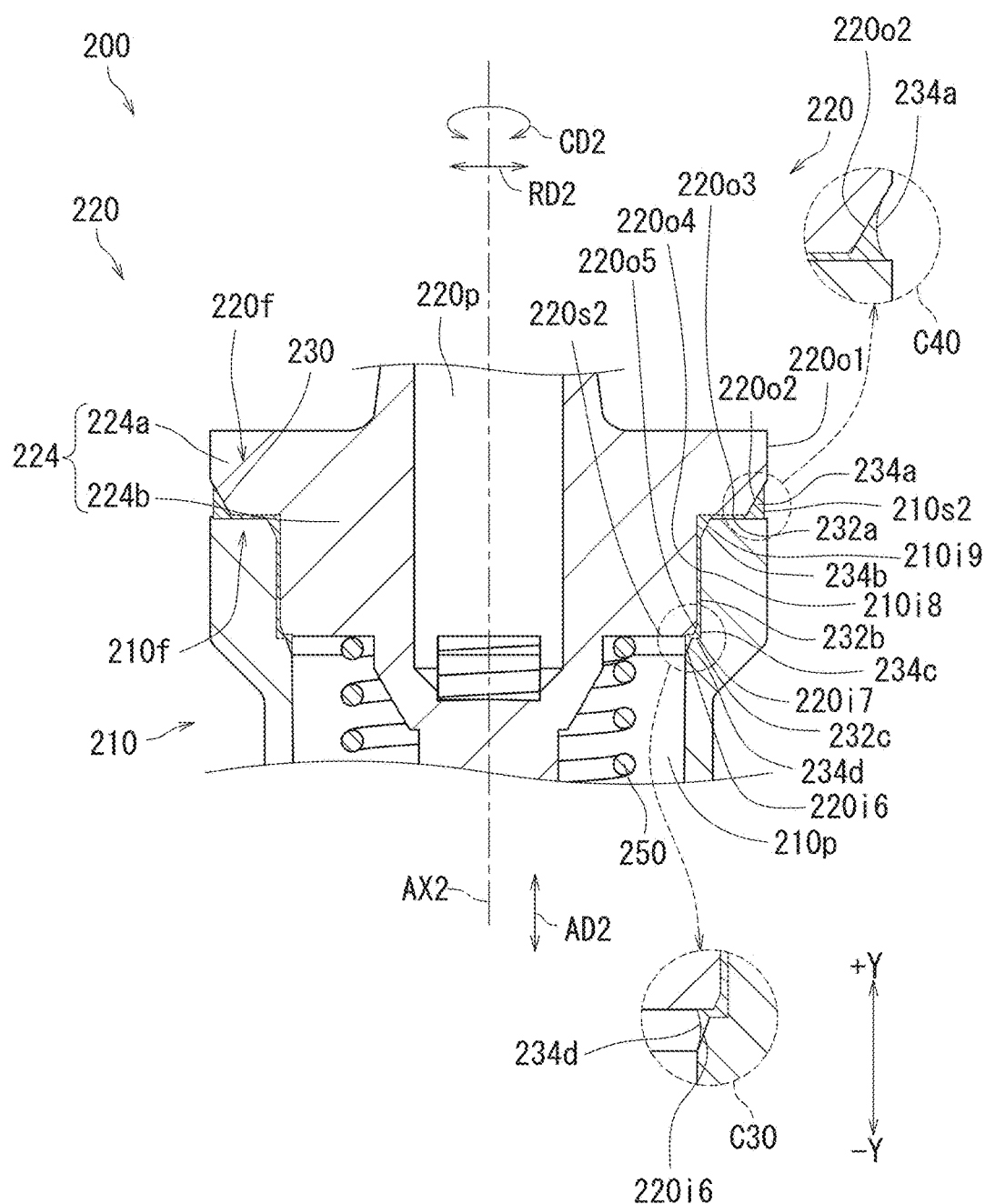
FIG. 12 is a partially enlarged view 12 of FIG. 9.
Figure 13:
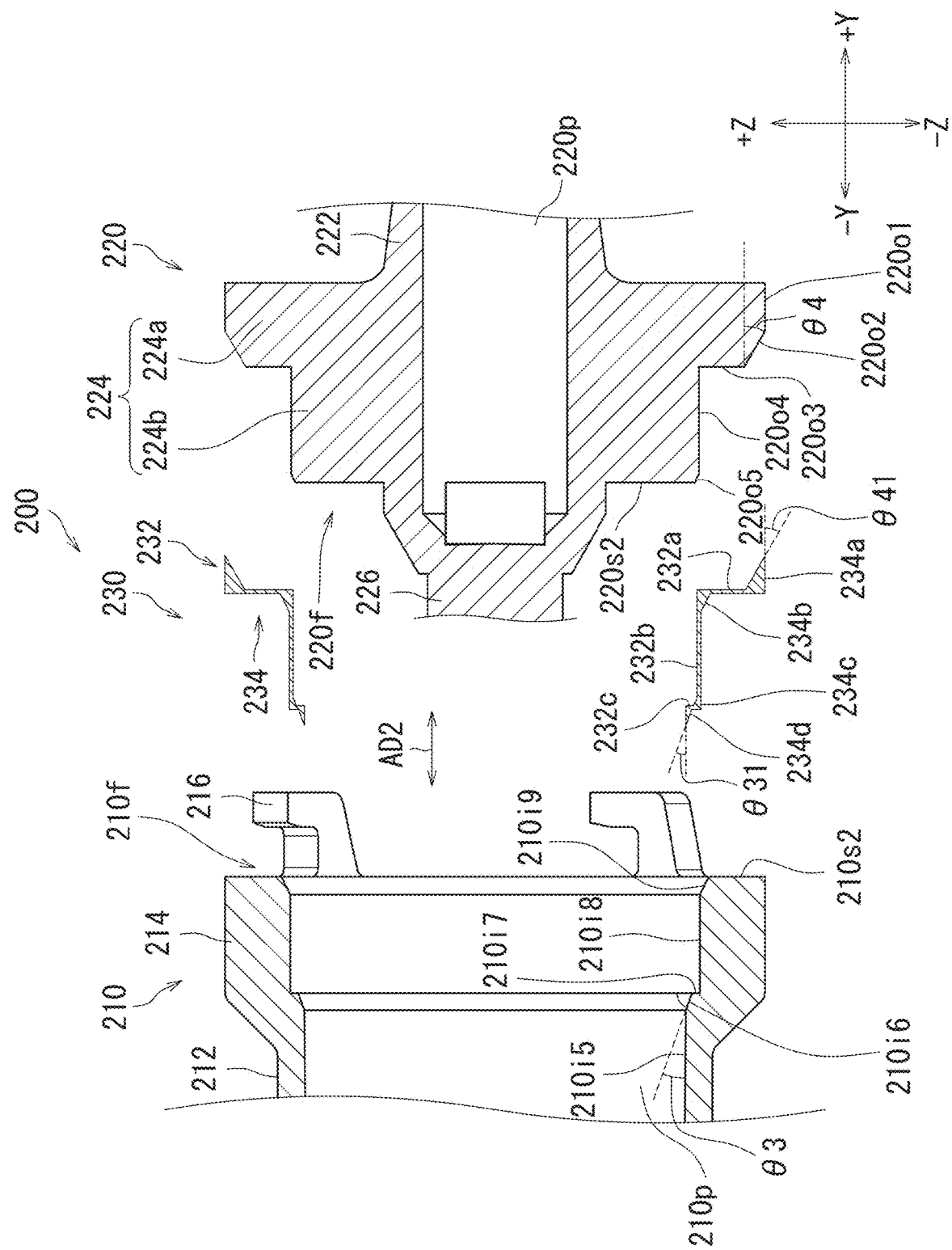
FIG. 13 is an exploded sectional view of a body, a pipe, and a seal in the connector of FIG. 9.

Next, the connector 200 according to the present example embodiment will be described with reference to FIGS. 8 to 13. FIG. 12 is a partially enlarged view of FIG. 9. FIG. 13 is an exploded sectional view of the body portion 210, the pipe portion 220, and the sealing portion 230 in the connector 200 of FIG. 9.

As shown in FIG. 12, the elastic portion 250 is located in the through hole 210p of the body portion 210.

The body portion 210 opposes the pipe portion 220. The body portion 210 has the opposing surface 210f opposing the pipe portion 220.

In the body portion 210, the part 210i6, the part 210i7, the part 210i8, the part 210i9, and the side surface 210s2 face the pipe portion 220. The part 210i6, the part 210i7, the part 210i8, the part 210i9, and the side surface 210s2 constitute the opposing surface 210f.

The part 210i6 extends obliquely with respect to the axial direction AD2. The inner diameter of the part 210i6 increases toward the −Y direction. The part 210i6 connects the part 210i5 and the part 210i7. The part 210i6 is a cutout surface where the part 210i5 is cut out.

The part 210i7 extends in the radial direction RD2 and the circumferential direction CD2. The normal line of the part 210i7 extends in the axial direction AD2.

The part 210i8 extends in the axial direction AD2 and the circumferential direction CD2. The normal line of the part 210i8 extends in the radial direction RD2.

The part 210i9 extends obliquely with respect to the axial direction AD2. The inner diameter of the part 210i9 increases toward the +Y direction. The part 210i9 connects the part 210i8 and the side surface 210s2. The part 210i9 is a cutout surface where the part 210i8 is cut out.

The side surface 210s2 connects the part 210i9 of the inner peripheral surface and the outer peripheral surface 210o. The side surface 210s2 extends in the radial direction RD2 and the circumferential direction CD2. The normal line of the side surface 210s2 extends in the axial direction AD2.

The pipe portion 220 opposes the body portion 210. The pipe portion 220 has the opposing surface 220f opposing the body portion 210.

In the pipe portion 220, the part 220o2, the part 220o3, the part 220o4, the part 220o5, and the side surface 220s2 constitute the opposing surface 220f.

The part 220o2 connects the part 220o1 and the part 220o3. The part 220o2 is a cutout surface where the part 220o1 is cut out. The outer diameter of the part 220o2 decreases toward the −Y direction.

The part 220o3 extends in the radial direction RD2 and the circumferential direction CD2. The normal line of the part 220o3 extends in the axial direction AD2.

The part 220o4 extends in the axial direction AD2 and the circumferential direction CD2. The normal line of the part 220o4 extends in the radial direction RD2.

The part 220o5 connects the part 220o4 and the side surface 220s2. The part 220o5 is a cutout surface where the part 220o4 is cut out. The outer diameter of the part 220o5 decreases toward the −Y direction.

The side surface 220s2 extends in the radial direction RD2 and the circumferential direction CD2. The normal line of the side surface 220s2 extends in the axial direction AD2.

On the inner peripheral surface 210i and the side surface 210s2 of the body portion 210 and the outer peripheral surface 220o and the side surface 220s2 of the pipe portion 220, the part 210i6 opposes the side surface 220s2, and the part 210i7 opposes the side surface 220s2 and the part 220o5. The part 210i8 opposes the part 220o5 and the part 220o4, the part 210i9 opposes the part 220o4 and the part 220o3, and the side surface 210s opposes the part 220o3 and the part 220o2.

The sealing portion 230 has a plate-shaped portion 232 and a reservoir portion 234. The plate-shaped portion 232 is positioned in a place between a part of the opposing surface 210f of the body portion 210 and a part of the opposing surface 220f of the pipe portion 220.

The reservoir portion 234 is positioned adjacent to the plate-shaped portion 232. The thickness of the reservoir portion 234 is larger than the thickness of the plate-shaped portion 232.

For example, the reservoir portion 234 is positioned between a part of the opposing surface 210f of the body portion 210 and a cutout surface of the opposing surface 220f of the pipe portion 220. Alternatively, the reservoir portion 234 is positioned between a cutout surface of the opposing surface 210f of the body portion 210 and a part of the opposing surface 220f of the pipe portion 220.

According to the present example embodiment, since the sealing portion 230 sealing between the body portion 210 and the pipe portion 220 has the reservoir portion 234, it is possible to suppress fluid leakage from the body portion 210 and the pipe portion 220.

In the connector 200 of the present example embodiment, the sealing portion 230 has a plurality of divided plate-shaped portions 232 and a plurality of divided reservoir portions 234. The plate-shaped portion 232 includes a first plate-shaped portion 232a, a second plate-shaped portion 232b, and a third plate-shaped portion 232c. The second plate-shaped portion 232b is coupled to the first plate-shaped portion 232a, and the third plate-shaped portion 232c is coupled to the second plate-shaped portion 232b.

In the present description, a reservoir portion positioned on the outermost side in the radial direction among the plurality of reservoir portions 234 may be described as an outer diameter-side reservoir portion, and a reservoir portion positioned on the innermost side in the radial direction among the plurality of reservoir portions 234 may be described as an inner diameter-side reservoir portion.

The first plate-shaped portion 232a extends in the radial direction RD2 and the circumferential direction CD2. The first plate-shaped portion 232a is positioned between the opposing surface 210f of the body portion 210 and the opposing surface 220f of the pipe portion 220 opposing each other in the axial direction. In detail, the first plate-shaped portion 232a is positioned between the side surface 210s2 of the body portion 210 and the part 220o3 of the pipe portion 220. The first plate-shaped portion 232a extends in an arc shape in the circumferential direction CD2.

The second plate-shaped portion 232b extends in the axial direction AD2 and the circumferential direction CD2. The second plate-shaped portion 232b is positioned between the opposing surface 210f of the body portion 210 and the opposing surface 220f of the pipe portion 220 opposing each other in the radial direction. In detail, the second plate-shaped portion 232b is positioned between the part 210i8 of the body portion 210 and the part 220o4 of the pipe portion 220. The second plate-shaped portion 232b extends tubularly in the circumferential direction CD2.

The third plate-shaped portion 232c extends in the radial direction RD2 and the circumferential direction CD2. The third plate-shaped portion 232c is positioned between the opposing surface 210f of the body portion 210 and the opposing surface 220f of the pipe portion 220 opposing each other in the axial direction. In detail, the third plate-shaped portion 232c is positioned between the part 210i7 of the body portion 210 and the side surface 220s2 of the pipe portion 220. The third plate-shaped portion 232c extends annularly in the circumferential direction CD2.

The reservoir portion 234 has a first reservoir portion 234a, a second reservoir portion 234b, a third reservoir portion 234c, and a fourth reservoir portion 234d.

The first reservoir portion 234a is positioned at the outer end portion in the radial direction of the first plate-shaped portion 232a. The first reservoir portion 234a is positioned between the side surface 210s2 of the body portion 210 and the part 220o2 of the pipe portion 220. The first reservoir portion 234a expands on the pipe portion 220 side in accordance with the part 220o2 of the pipe portion 220. The first reservoir portion 234a extends in an arc shape in the circumferential direction CD2.

The second reservoir portion 234b is positioned across the boundary between the first plate-shaped portion 232a and the second plate-shaped portion 232b. The second reservoir portion 234b is positioned between the part 210i9 of the body portion 210 and the parts 220o3 and 220o4 of the pipe portion 220. The second reservoir portion 234b expands on the body portion 210 side in accordance with the part 210s9 of the body portion 210. The second reservoir portion 234b extends annularly in the circumferential direction CD2.

The third reservoir portion 234c is positioned across the boundary between the second plate-shaped portion 232b and the third plate-shaped portion 232c. The third reservoir portion 234c is positioned between the parts 210i7 and 210i8 of the body portion 210 and the part 220o5 of the pipe portion 220. The third reservoir portion 234c expands on the pipe portion 220 side in accordance with the part 220o5 of the pipe portion 220. The third reservoir portion 234c extends annularly in the circumferential direction CD2.

The fourth reservoir portion 234d is positioned at the inner end portion in the radial direction of the third plate-shaped portion 232c. The fourth reservoir portion 234d is positioned between the part 210i6 of the body portion 210 and the side surface 220s2 of the pipe portion 220. The first reservoir portion 234a expands on the body portion 210 side in accordance with the part 210i6 of the body portion 210. The fourth reservoir portion 234d extends annularly in the circumferential direction CD2.

In the present description, a reservoir portion positioned on one axial side (+Y direction) with respect to the second plate-shaped portion 232b extending in the axial direction AD2 may be described as one axial side reservoir portion, and a reservoir portion positioned on the axial other side (−Y direction) may be described as another axial side reservoir portion.

As shown in FIG. 13, the body portion 210 opposes the pipe portion 220 via the sealing portion 230. The sealing portion 230 is positioned between the body portion 210 and the pipe portion 220. The sealing portion 230 is formed in accordance with the shapes of the opposing surface 210f of the body portion 210 and the opposing surface 220f of the pipe portion 220.

The sealing portion 230 includes a sealing material. For example, the sealing portion 230 includes an adhesive. In one example, the adhesive includes an epoxy resin. The epoxy resin can achieve low-temperature curability, flexibility, and resistance to fracture. Specific examples of the adhesive include NB3041B. Alternatively, the adhesive includes AE-780.

The difference between the solubility parameter (SP value) of the sealing material and the solubility parameter of the fluid flowing through the connector 200 is preferably 1 or greater. For example, the fluid is water.

In this manner, the difference between the solubility parameter of the sealing material and the solubility parameter of the fluid flowing through the flow path is preferably 1 or greater. This can suppress the sealing material from dissolving in the fluid.

The sealing portion 230 includes the first reservoir portion 234a, the first plate-shaped portion 232a, the second reservoir portion 234b, the second plate-shaped portion 232b, the third reservoir portion 234c, the third plate-shaped portion 232c, and the fourth reservoir portion 234d.

The first reservoir portion 234a is formed in a gap between the side surface 210s2 of the body portion 210 and the part 220o2 of the pipe portion 220.

The first plate-shaped portion 232a is formed in a gap between the side surface 210s2 of the body portion 210 and the part 220o3 of the pipe portion 220.

The second reservoir portion 234b is formed in a gap between the part 210i9 of the body portion 210 and the parts 220o3 and 220o4 of the pipe portion 220.

The second plate-shaped portion 232b is formed in a gap between the part 210i8 of the body portion 210 and the part 220o4 of the pipe portion 220.

The third reservoir portion 234c is formed in a gap between the parts 210i8 and 210i7 of the body portion 210 and the part 220o5 of the pipe portion 220.

The third plate-shaped portion 232c is formed in a gap between the part 210i7 of the body portion 210 and the side surface 220s2 of the pipe portion 220.

The fourth reservoir portion 234d is formed in a gap between the part 210i6 of the body portion 210 and the side surface 220s2 of the pipe portion 220.

In the present example embodiment, the connector 200 is provided with a flow path extending in the axial direction AD2 along the central axis AX2. The connector 200 includes the body portion 210 having a through hole extending in the axial direction AD2, the pipe portion 220 having a through hole extending in the axial direction AD2, and the sealing portion 230 including a sealing material to seal between the body portion 210 and the pipe portion 220. The body portion 210 has the body portion-side opposing surface 210f opposing the pipe portion 220. The pipe portion 220 has the pipe portion-side opposing surface 220f opposing the body portion 210. The sealing portion 230 is positioned between the body portion-side opposing surface 210f and the pipe portion-side opposing surface 220f. The sealing portion 230 has the reservoir portion in which the sealing material collects between the body portion-side opposing surface 210f and the pipe portion-side opposing surface 220f.

Since the sealing portion 230 has the reservoir portion 234 in which the sealing material sealing the body portion 210 and the pipe portion 220 collects between the body portion-side opposing surface 210f and the pipe portion-side opposing surface 220f, it is possible to sufficiently seal between the body portion 210 and the pipe portion 220 and it is possible to suppress fluid leakage from between the body portion 210 and the pipe portion 220.

The body portion-side opposing surface 210f and the pipe portion-side opposing surface 220f face each other in the radial direction RD2 orthogonal to the axial direction AD2 and the central axis AX2. This can suppress a foreign matter from being mixed into the body portion 210 and/or the pipe portion 220 from between the body portion 210 and the pipe portion 220.

The sealing portion 230 includes the first plate-shaped portion 232a positioned between the side surface 210s2 of the body portion 210 and the outer peripheral surface (the part 220o3) of the pipe portion 220 opposing in the axial direction AD2, the second plate-shaped portion 232b coupled to the first plate-shaped portion 232a and positioned between the inner peripheral surface (the part 210i8) of the body portion 210 and the outer peripheral surface (the part 220o4) of the pipe portion 220 opposing in the radial direction RD2, and the third plate-shaped portion 232c coupled to the second plate-shaped portion 232b and positioned between the inner peripheral surface (the part 210i7)

of the body portion 210 and the side surface 220s2 of the pipe portion 220 opposing in the axial direction AD2. This can further suppress a foreign matter from being mixed into the body portion 210 and/or the pipe portion 220 from between the body portion 210 and the pipe portion 220.

At least one of the body portion-side opposing surface 210f and the pipe portion-side opposing surface 220f has the cutout surface (the parts 210i6, 210i9, 220o2, and 220o5) obtained by cutting out a plane parallel to the axial direction AD2 or the radial direction RD2. This makes it possible to easily form the reservoir portion (the first reservoir portion 234a to the fourth reservoir portion 234d) of the sealing material.

The sealing portion 230 has the plurality of reservoir portions (the first reservoir portion 234a to the fourth reservoir portion 234d) as reservoir portions. The plurality of reservoir portions include the outer diameter-side reservoir portion (the first reservoir portion 234a) positioned on the outermost side in the radial direction among the plurality of reservoir portions, and the inner diameter-side reservoir portion (the fourth reservoir portion 234d) positioned on the innermost side in the radial direction among the plurality of reservoir portions.

[0277-1]Here, as shown in FIG. 13, in the connector 200, the plurality of cutout surfaces (the parts 210i6, 210i9, 220o2, and 220o5) are located as cutout surfaces. The plurality of cutout surfaces include an outer diameter-side cutout surface (the part 220o2) and an inner diameter-side cutout surface (the part 210i6). The outer diameter-side cutout surface (the part 220o2) is a cutout surface positioned at the outer end portion in the radial direction of the pipe portion-side opposing surface 220f among the plurality of cutout surfaces. The inner diameter-side cutout surface (the part 210i6) is a cutout surface communicating with the through hole 210p among the plurality of cutout surfaces.

[0277-1-1]In a case where the outer diameter-side reservoir portion (the first reservoir portion 234a) and the inner diameter-side reservoir portion (the fourth reservoir portion 234d) are exposed in the radial direction RD2, the slant (slant angle θ3) with respect to the axial direction AD2 of the inner diameter-side cutout surface (the part 210i6) is smaller than the slant (slant angle θ4) with respect to the axial direction AD2 of the outer diameter-side cutout surface (the part 220o2). Therefore, in a case where the sealing portion 230 is formed, when the sealing material (adhesive) is held by capillary force, the sealing material (adhesive) and the elastic portion 250 can be suppressed from coming into contact with each other. That is, the inner diameter-side reservoir portion (the fourth reservoir portion 234d) can be suppressed from expanding in the radial direction RD2. Therefore, the sealing material of the inner diameter-side reservoir portion is suppressed from adhering to the elastic portion 250 and the like. In the example of FIG. 12, the outer diameter-side reservoir portion (the first reservoir portion 234a) is exposed outward in the radial direction. The inner diameter-side reservoir portion (the fourth reservoir portion 234d) is exposed inward in the radial direction.

[0277-3]Since the outer diameter-side cutout surface (the part 220o2) and the inner diameter-side cutout surface (the part 210i6) are configured as described above, a slant (a slant angle θ31) with respect to the axial direction AD2 of the inner diameter-side reservoir portion (the fourth reservoir portion 234d) is smaller than a slant (a slant angle θ41) with respect to the axial direction AD2 of the outer diameter-side reservoir portion (the first reservoir portion 234a). Note that in FIG. 12, the inner diameter-side reservoir portion (the fourth reservoir portion 234d) and the outer diameter-side reservoir portion (the first reservoir portion 234a) are schematically shown in a triangular shape, but are actually curved as shown in circles C30 and C40. In detail, as shown in the circles C30 and C40, since the sealing portion 230 is held using the surface tension and the atmospheric pressure, the curvatures of the inner diameter-side reservoir portion (the fourth reservoir portion 234d) and the outer diameter-side reservoir portion (the first reservoir portion 234a) become substantially equal. Therefore, by reducing the slant angle θ3 (FIG. 13), it is possible to suppress expansion in the radial direction RD2 of the sealing material (adhesive) constituting the sealing portion 230.

The sealing portion 230 has the plate-shaped portion (the second plate-shaped portion 232b) positioned between the inner peripheral surface (the part 210i8) of the body portion 210 and the outer peripheral surface (the part 220o4) of the pipe portion 220 opposing each other in the radial direction RD2. The reservoir portion 234 includes at least one of the reservoir portion (the second reservoir portion 234b) positioned on one axial side (+Y direction) of this plate-shaped portion (the second plate-shaped portion 232b) and the reservoir portion (the third reservoir portion 234c) positioned on the axial other side (−Y direction) of the plate-shaped portion (the second plate-shaped portion 232b). This makes it possible to easily form the reservoir portion (the second reservoir portion 234b and/or the third reservoir portion 234c) at the end portion of the second plate-shaped portion 232b extending in the axial direction AD2 in the sealing portion 230.

The sealing portion 230 has the plate-shaped portion (the second plate-shaped portion 232b) positioned between the inner peripheral surface (the part 210i8) of the body portion 210 and the outer peripheral surface (the part 220o4) of the pipe portion 220 opposing each other in the radial direction RD2. The reservoir portion 234 includes the one axial side reservoir portion (the second reservoir portion 234b) positioned on one axial side (+Y direction) of this plate-shaped portion (the second plate-shaped portion 232b) and the axial other side reservoir portion (the third reservoir portion 234c) positioned on the axial other side (−Y direction) of this plate-shaped portion (the second plate-shaped portion 232b). The sectional area of the one axial side reservoir portion (the second reservoir portion 234b) is larger than the sectional area of the axial other side reservoir portion (the third reservoir portion 234c). In this manner, it is possible to easily fill the sealing material by providing a reservoir portion having a large sectional area, and at the same time, it is possible to reduce the amount of a necessary sealing material by providing a reservoir portion having a small sectional area.

The connector 200 of the present example embodiment further includes the elastic portion 250 located in the flow path, and a valve portion (the moving member 260) that is located in the through hole 210p and moves in the axial direction AD2 in accordance with the elastic portion 250 in contact with the elastic portion 250. The reservoir portion 234 is positioned outside in the radial direction relative to the elastic portion 250 and the valve portion. This can suppress the sealing portion 230 from coming into contact with the elastic portion 250 and the valve portion.

According to the present example embodiment, the pipe portion 220 has the column portion 226, and the valve portion (the moving member 260) closes the flow path together with the column portion 226. Therefore, the connector 200 can be used as a socket.

[0281-1]Note that in FIG. 13, the sealing portion 230 is configured as a single member. However, the sealing portion 230 may include a plurality of members. For example, the sealing portion 230 need not have all or some of the first plate-shaped portion 232a, the second plate-shaped portion 232b, and the third plate-shaped portion 232c. For example, in the sealing portion 230, all of the first reservoir portion 234a, the second reservoir portion 234b, the third reservoir portion 234c, and the fourth reservoir portion 234d need not be coupled, and all or some of the first reservoir portion 234a, the second reservoir portion 234b, the third reservoir portion 234c, and the fourth reservoir portion 234d may be separated.

[0281-2]In FIG. 13, the outer diameter-side cutout surface (the part 220o2) is a cutout surface positioned at the outer end portion in the radial direction of the pipe portion-side opposing surface 220f, and the inner diameter-side cutout surface (the part 210i6) is a cutout surface communicating with the through hole 210p. However, the outer diameter-side cutout surface may be a cutout surface (part) positioned at the outer end portion in the radial direction of the body portion-side opposing surface 210f, and the inner diameter-side cutout surface may be a cutout surface (part) communicating with the through hole 220p.

[0281-3]Note that when the outer diameter-side reservoir portion and the inner diameter-side reservoir portion are exposed in the axial direction AD2, the slant (slant angle) with respect to the radial direction RD2 of the inner diameter-side cutout surface is smaller than the slant (slant angle) with respect to the radial direction RD2 of the outer diameter-side cutout surface.

Figure 14A:
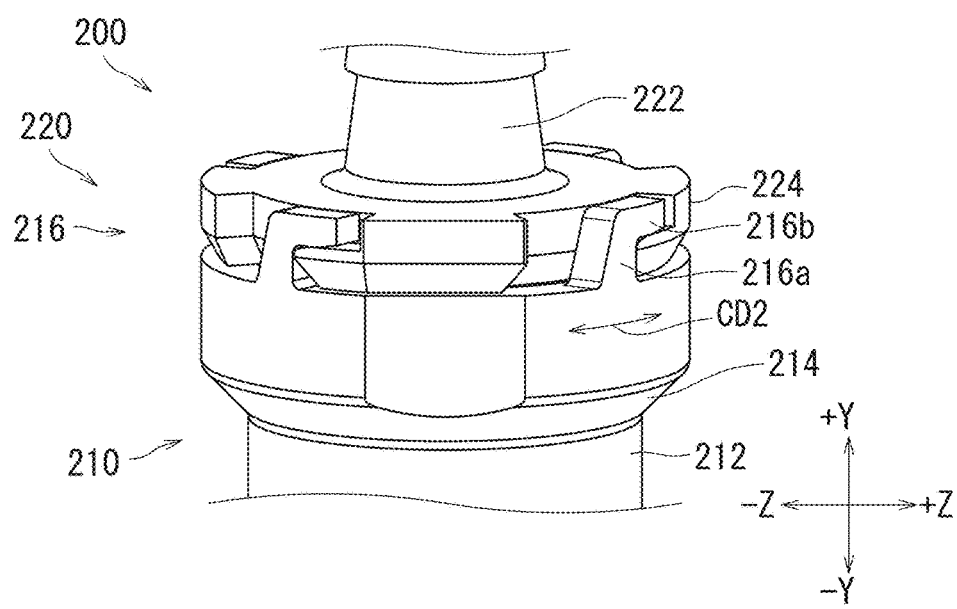
FIG. 14A is a partially enlarged perspective view of the connector of FIG. 8.
Figure 14B:
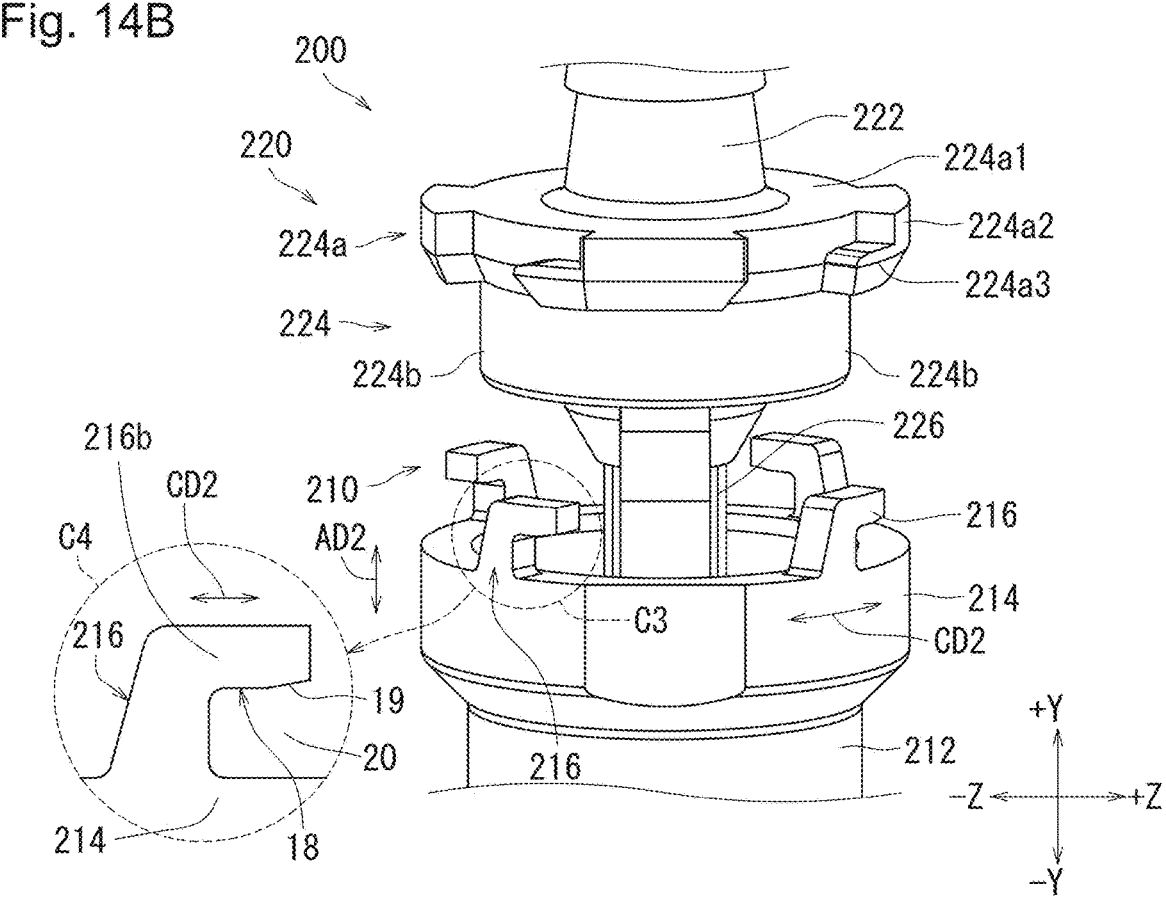
FIG. 14B is a partially enlarged exploded perspective view of the connector of FIG. 8.

Next, the connector 200 according to the present example embodiment will be described with reference to FIGS. 8 to 14B. FIG. 14A is a partially enlarged perspective view of the connector 200 of FIG. 8. FIG. 14B is a partially enlarged exploded perspective view of the connector 200 of FIG. 8. Note that in FIGS. 14A and 14B, the sealing portion 230 will be omitted in order to avoid the drawing from being excessively complicated.

As shown in FIGS. 14A and 14B, the body portion 210 includes the tube portion 212, the attachment portion 214, and the claw portion 216. The claw portion 216 has a first part 216a extending in the axial direction AD2 from the end portion of the body portion 210 and a second part 216b extending in the circumferential direction from the end portion of the first part 216a.

The pipe portion 220 has the tube portion 222 and the attachment portion 224. The attachment portion 224 has the base portion 224a coupled to the tube portion 222 and the projection portion 224b coupled to the base portion 224a and positioned on the −Y direction side. The base portion 224a has a partially different outer diameter in the radial direction RD2, and the projection portion 224b is cylindrical. The base portion 224a has a central portion 224a1, an expansion portion 224a2 coupled to the central portion 224a1 and partially extending in the radial direction RD2 from the outer diameter of the central portion 224a1, and a projection portion 224a3 extending in the circumferential direction from the expansion portion 224a2. The expansion portion 224a2 extends in the radial direction RD2 from the central portion 224a1 in four directions orthogonal to one another. The projection portion 224a3 extends from the −Y direction side to one side on the circumferential direction on one side on the circumferential direction of the expansion portion 224a2. The projection portion 224a3 is an example of a holding mechanism.

As understood from FIGS. 14A and 14B, the claw portion 216 of the body portion 210 is inserted from between adjacent two expansion portions 224a2 of the pipe portion 220. Thereafter, the pipe portion 220 is rotated to one side in the circumferential direction with respect to the body portion 210, whereby the claw portion 216 of the body portion 210 is press-fitted into the projection portion 224a3 of the pipe portion 220. This can effectively hold the positions of the body portion 210 and the pipe portion 220.

The length in the axial direction AD2 of the claw portion 216 of the body portion 210 is substantially equal to the length in the axial direction AD2 of the base portion 224a of the pipe portion 220. The length in the axial direction AD2 of the first part 216a is substantially equal to the length in the axial direction AD2 of the projection portion 224a3. This allows the claw portion 216 of the body portion 210 to be relatively quickly press-fitted into the projection portion 224a3 of the pipe portion 220, allows the claw portion 216 of the body portion 210 to be suppressed from projecting from the attachment portion 224 of the pipe portion 220, and allows the claw portion 216 to be suppressed from colliding with an unintended member.

The claw portion 216 has the second part 216b extending in the circumferential direction CD2. Therefore, after the claw portion 216 of the body portion 210 is inserted from between the adjacent two expansion portions 224a2 of the pipe portion 220, the body portion 210 is rotated in the circumferential direction CD2 to press-fit the second part 216b of the claw portion 216 into the projection portion 224a3 of the pipe portion 220. This can strongly attach the body portion 210 to the pipe portion 220 even when the elastic portion 250 strongly presses the pipe portion 220.

[0287-1]In FIG. 14B, the claw portion 216 in the circle C4 shows a state in which the claw portion 216 in the circle C3 is viewed from the radial direction RD2. The second part 216b has an opposing surface 18 opposing in the axial direction AD2 with respect to the attachment portion 214. The opposing surface 18 extends in the circumferential direction CD2. The opposing surface 18 includes a slant surface 19. The slant surface 19 is slanting with respect to the circumferential direction CD2 so as to be away in the axial direction AD2 from the attachment portion 214. Therefore, the claw portion 216 can be easily press-fitted into the projection portion 224a3 of the pipe portion 220. In other words, the projection portion 224a3 can be easily press-fitted into a gap 20 between the opposing surface 18 and the attachment portion 214.

Note that in the above description, the claw portion 216 is provided in the body portion 210, but the present example embodiment is not limited to this. The claw portion may be provided on the pipe portion 220.

In the above description, the claw portion 216 and the projection portion 224a3 have been described as an example of the holding mechanism holding the positions of the body portion 210 and the pipe portion 220, but the present example embodiment is not limited to this. The holding mechanism may include a fixing pin fixing the position of the pipe portion 220 with respect to the body portion 210 after a part of the pipe portion 220 is inserted into the body portion 210.

In this case, the holding mechanism includes a plurality of pins parallel to the Z direction and a plurality of pins parallel to the Y direction. After the part of the pipe portion 220 is inserted into the body portion 210, each of these pins is inserted so as to pass through between wall portions of the pipe portion 220 in the body portion 210 and penetrate the pipe portion 220. Due to this, the position of the pipe portion 220 with respect to the body portion 210 may be defined, and the positions of the pipe portion 220 and the body portion 210 may be held.

Alternatively, the holding mechanism may have a protrusion part filling between the claw portion 216 of the body portion 210 and the expansion portion 224a2 of the pipe portion 220, and a base member holding the protrusion part. Alternatively, the holding mechanism may include a clamp fixing the attachment portion 214 of the body portion 210 and the attachment portion 224 of the pipe portion 220 in the axial direction.

In this manner, the connector 200 of the present example embodiment further includes the holding mechanism holding the positions of the body portion 210 and the pipe portion 220. The sealing portion 230 can sufficiently seal between the body portion 210 and the pipe portion 220 by the holding mechanism holding the positions of the body portion 210 and the pipe portion 220. The holding mechanism suppresses the body portion 210 and the pipe portion 220 from being twisted by an external force, and makes the sealing portion 230 (sealing material) hardly removed.

The holding mechanism may have a claw portion extending from one member of the body portion 210 and the pipe portion 220 and hooking on the other member of the body portion 210 and the pipe portion 220. The claw portion has a first part extending in the axial direction AD2 from one member and a second part extending in the circumferential direction CD2 from the tip end of the first part, and the second part opposes the other member in the axial direction. For example, the holding mechanism may have the claw portion 216 extending from the body portion 210 and hooking on the pipe portion 220. The claw portion 216 has the first part 216a extending in the axial direction AD2 from the body portion 210 and the second part 216b extending in the circumferential direction from the tip end of the first part 216a, and the second part 216b opposes the pipe portion 220 in the axial direction AD2. The claw portion 216 can suppress movement in the circumferential direction CD2 and the axial direction AD2 with a simple structure.

Note that although the connector 100 functioning as a plug and the connector 200 functioning as a socket have been described in the above description, the connector 100 and the connector 200 may be used simultaneously.

Figure 15:
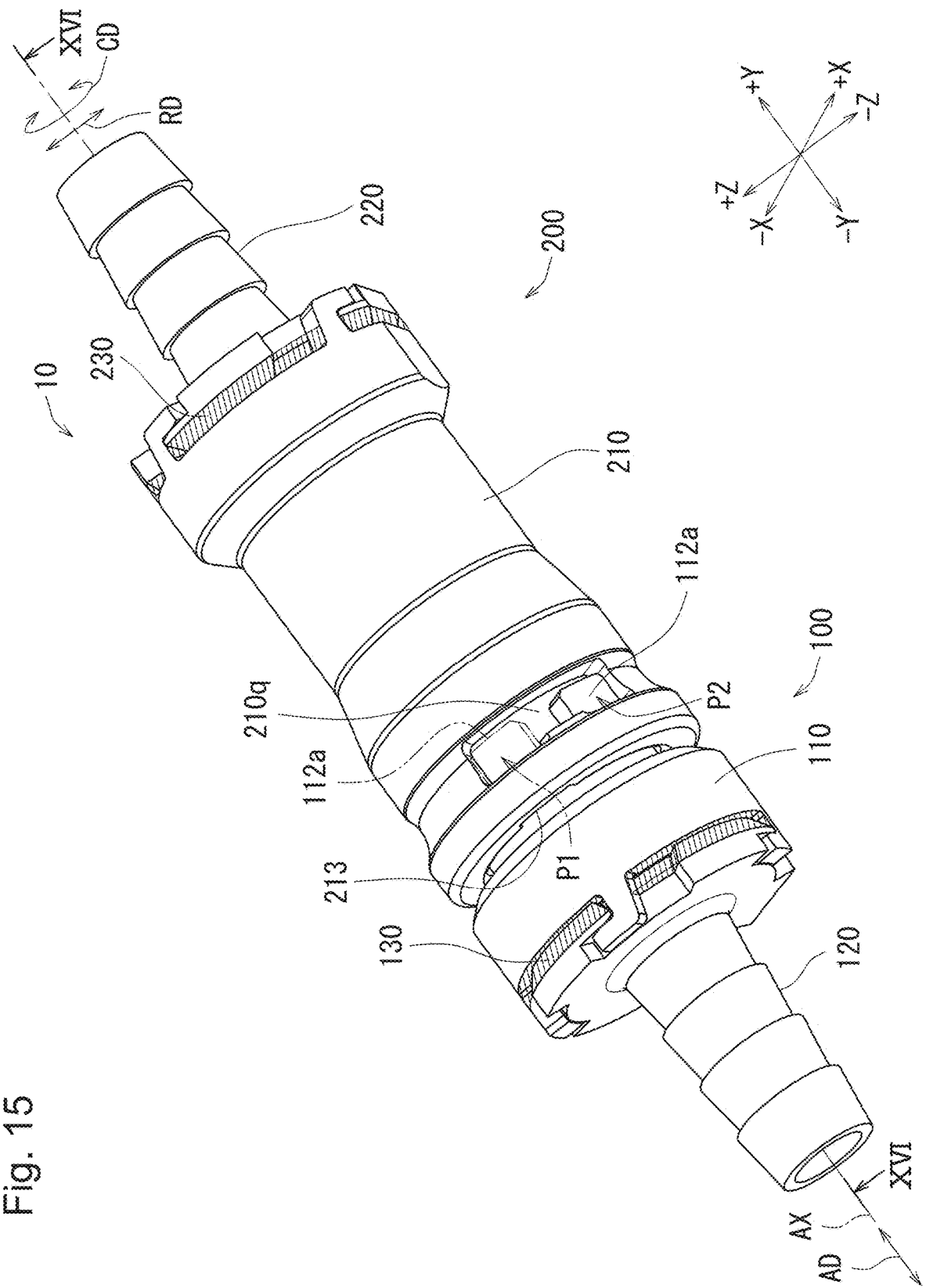
FIG. 15 is a perspective view of a connection assembly according to the present example embodiment.

Next, a connection assembly 10 according to the present example embodiment will be described with reference to FIGS. 1 to 15. FIG. 15 is a perspective view of the connection assembly 10 according to the present example embodiment.

As shown in FIG. 15, the connection assembly 10 includes the connector 100 and the connector 200. The connection assembly 10 extends in a central axis AX where the central axis AX1 of the connector 100 and the central axis AX2 of the connector 200 coincide with each other, and the connector 100 and the connector 200 are located side by side in the axial direction AD where the axial direction AD1 and the axial direction AD2 coincide with each other. In the present description, the connector 100 may be described as a first connector 100, and the connector 200 may be described as a second connector 200.

In the connection assembly 10, the connector 100 and the connector 200 are arrayed along the central axis AX. A part of the connector 100 is accommodated in the connector 200. In detail, a part of the body portion 110 of the connector 100 is accommodated in the body portion 210 of the connector 200.

In detail, when the connector 100 and the connector 200 are joined, the protrusion portion 112a (two-dot chain line) is inserted in the axial direction AD from the recess portion 213 (FIG. 8). As a result, the protrusion portion 112a (two-dot chain line) is located at a position P1 of the through hole 210q. Furthermore, when the connector 100 is rotated in the circumferential direction CD, the protrusion portion 112a is located at a position P2 of the through hole 210q. That is, the protrusion portion 112a of the body portion 110 in the connector 100 is located at the position P2 in the through hole 210q of the body portion 210 in the connector 200. As a result, the position of the protrusion portion 112a is shifted in the circumferential direction CD with respect to the recess portion 213, and thus the connector 100 and the connector 200 are locked.

Next, the connection assembly 10 according to the present example embodiment will be described with reference to FIGS. 1 to 16. FIG. 16 is a sectional view taken along line XVI-XVI of FIG. 15. In detail, FIG. 16 shows a cross section taken along a cut plane including the central axis AX of FIG. 15, the cut plane cutting the protrusion portion 112a.

As shown in FIG. 16, when the tube portion 112 of the body portion 110 of the connector 100 is inserted into the tube portion 212 of the body portion 210 of the connector 200, the front end (the side surface 110s1) in the axial direction AD of the body portion 110 and the front end in the axial direction AD of the moving member 260 come into contact with each other. Therefore, the moving member 260 moves toward the +Y direction by the body portion 110. At the same time, when the tube portion 112 of the body portion 110 is inserted into the tube portion 212 of the body portion 210, the front end portion in the axial direction AD of the column portion 226 and the front end portion in the axial direction AD of the moving member 160 come into contact with each other. Therefore, the moving member 160 moves in the −Y direction. As a result, the flow path of the connector 100 and the flow path of the connector 200 are connected. Therefore, the fluid circulates between the connector 100 and the connector 200.

In the present example embodiment, the connection assembly 10 includes the first connector 100 and the second connector 200. Each of the first connector 100 and the second connector 200 is provided with a flow path extending in the axial direction AD along the central axis AX. The first connector 100 includes the body portion 110 having a through hole extending in the axial direction AD, the pipe portion having a through hole extending in the axial direction AD, the sealing portion 130 including a sealing material sealing between the body portion 110 and the pipe portion 120, the elastic portion 150 located in the flow path, and the valve portion located in the through hole 110p and moves in the axial direction AD in accordance with the elastic portion 150 in contact with the elastic portion 150.

In the first connector 100, the body portion 110 has the body portion-side opposing surface 110f opposing the pipe portion 120. The pipe portion 120 has the pipe portion-side opposing surface 120f opposing the body portion 110. The sealing portion 130 is positioned between the body portion-side opposing surface 110f and the pipe portion-side opposing surface 120f. The sealing portion 130 has the reservoir portion 134 in which the sealing material collects between the body portion-side opposing surface 110f and the pipe portion-side opposing surface 120f. The valve portion closes the opening portion of the body portion 110.

The second connector 200 includes the body portion 210 having a through hole extending in the axial direction AD, the pipe portion 220 having a through hole extending in the axial direction AD, the sealing portion 230 including a sealing material sealing between the body portion 210 and the pipe portion 220, the elastic portion 250 located in the flow path, and the valve portion located in the through hole and moves in the axial direction in accordance with the elastic portion 250 in contact with the elastic portion 250. In the second connector 200, the body portion 210 has the body portion-side opposing surface 210*f* opposing the pipe portion. The pipe portion 220 has the pipe portion-side opposing surface 220*f* opposing the body portion. The sealing portion 230 is positioned between the body portion-side opposing surface 210*f* and the pipe portion-side opposing surface 220*f*. The sealing portion 230 has the reservoir portion 234 in which the sealing material collects between the body portion-side opposing surface 210*f* and the pipe portion-side opposing surface 220*f*. The pipe portion 220 has the column portion 226. The valve portion closes the flow path together with the column portion 226. This can sufficiently seal between the body portion 110 and the pipe portion 120 and between the body portion 210 and the pipe portion 220.

The present example embodiment has been described above with reference to the drawings. However, the present disclosure is not limited to the above example embodiment, and can be implemented in various modes without departing from the gist of the present disclosure. The plurality of constituent elements disclosed in the above example embodiment can be appropriately modified. For example, a certain constituent element of all constituent elements shown in a certain example embodiment may be added to a constituent element of another example embodiment, or some constituent elements of all constituent elements shown in a certain example embodiment may be eliminated from the example embodiment.

The drawings schematically show each constituent element mainly in order to facilitate understanding of the disclosure, and the thickness, length, number, interval, and the like of each of the shown constituent elements may be different from the reality for convenience of creation of the drawings. The configuration of each constituent element shown in the above example embodiment is an example and is not particularly limited, and it goes without saying that various modifications can be made without substantially departing from the effects of the present disclosure.

Note that the present technique can have the following configurations.

(1) A connector provided with a flow path extending in an axial direction along a central axis, the connector including: a body portion including a through hole extending in the axial direction; a pipe portion including a through hole extending in the axial direction; and a sealing portion including a sealing material sealing between the body portion and the pipe portion, in which the body portion includes a body portion-side opposing surface opposing the pipe portion, the pipe portion includes a pipe portion-side opposing surface opposing the body portion, the sealing portion is positioned between the body portion-side opposing surface and the pipe portion-side opposing surface, and the sealing portion includes a reservoir portion in which the sealing material collects between the body portion-side opposing surface and the pipe portion-side opposing surface.

(2) The connector according to (1), further including a holding mechanism holding positions of the body portion and the pipe portion.

(3) The connector according to (2), in which the holding mechanism includes a claw portion extending from one portion of the body portion and the pipe portion and hooking on another portion of the body portion and the pipe portion, the claw portion includes a first portion extending in the axial direction from the one portion, and a second portion extending in a circumferential direction from a tip end of the first part, and the second part opposes the other member in the axial direction.

(4) The connector according to any of (1) to (3), in which at least one of the body portion-side opposing surface and the pipe portion-side opposing surface has a cutout surface obtained by cutting out a plane parallel to the axial direction or radial direction, and the radial direction is orthogonal to the central axis.

(5) The connector according to (4), in which the sealing portion includes a plurality of reservoir portions as the reservoir portion, the plurality of reservoir portions include an outer diameter-side reservoir portion positioned on an outermost side in a radial direction among the plurality of reservoir portions, and an inner diameter-side reservoir portion positioned on an innermost side in a radial direction among the plurality of reservoir portions, a plurality of cutout surfaces are located as the cutout surface, the plurality of cutout surfaces include an outer diameter-side cutout surface positioned at an outer end portion in a radial direction of the body portion-side opposing surface or the pipe portion-side opposing surface among the plurality of cutout surfaces, and an inner diameter-side cutout surface communicating with the through hole among the plurality of cutout surfaces, when the outer diameter-side reservoir portion and the inner diameter-side reservoir portion are exposed in the radial direction, a slant with respect to the axial direction of the inner diameter-side cutout surface is smaller than a slant with respect to the axial direction of the outer diameter-side cutout surface, and when the outer diameter-side reservoir portion and the inner diameter-side reservoir portion are exposed in the axial direction, a slant with respect to the radial direction of the inner diameter-side cutout surface is smaller than a slant with respect to the radial direction of the outer diameter-side cutout surface.

(6) The connector according to any of (1) to (5), in which the body portion-side opposing surface and the pipe portion-side opposing surface oppose each other in the axial direction and a radial direction orthogonal to the central axis.

(7) The connector according to (6), in which the sealing portion includes a first plate-shaped portion positioned between a side surface of the body portion and an outer peripheral surface of the pipe portion opposing each other in the axial direction, a second plate-shaped portion coupled to the first plate-shaped portion and positioned between an inner peripheral surface of the body portion and an outer peripheral surface of the pipe portion opposing each other in the radial direction, and a third plate-shaped portion coupled to the second plate-shaped portion and positioned between an inner peripheral surface of the body portion and a side surface of the pipe portion opposing each other in the axial direction.

(8) The connector according to any of (4) to (7), in which the sealing portion further includes a plate-shaped portion positioned between an inner peripheral surface of the body portion and an outer peripheral surface of the pipe portion opposing each other in the radial direction, and the reservoir portion includes at least one of a reservoir portion positioned on one axial side of the plate-shaped portion and a reservoir portion positioned on another axial side of the plate-shaped portion.

(9) The connector according to any of (4) to (7), in which the sealing portion further includes a plate-shaped portion positioned between an inner peripheral surface of the body portion and an outer peripheral surface of the pipe portion opposing each other in the radial direction, the reservoir portion includes one axial side reservoir portion positioned on one side in an axial direction of the plate-shaped portion, and another axial side reservoir portion positioned on another side in an axial direction of the plate-shaped portion, and a sectional area of the one axial side reservoir portion is larger than a sectional area of the axial other side reservoir portion.

(10) The connector according to any of (4) to (9), further including: an elastic portion located in the flow path; and a valve portion that is located in the through hole and moves in the axial direction in accordance with the elastic portion in contact with the elastic portion, in which the reservoir portion is positioned outside in the radial direction relative to the elastic portion and the valve portion.

(11) The connector according to (10), in which the valve portion closes an opening portion of the body portion.

(12) The connector according to (10), in which the pipe portion includes a column portion, and the valve portion closes the flow path together with the column portion.

(13) The connector according to any of (1) to (12), in which a difference between a solubility parameter of the sealing material and a solubility parameter of a fluid flowing through the flow path is 1 or greater.

(14) A connection assembly including a first connector and a second connector, in which each of the first connector and the second connector is provided with a flow path extending in an axial direction along a central axis, the first connector includes a body portion including a through hole extending in the axial direction, a pipe portion including a through hole extending in the axial direction, a sealing portion including a sealing material sealing between the body portion and the pipe portion, an elastic portion located in the flow path, and a valve portion that is located in the through hole and moves in the axial direction in accordance with the elastic portion in contact with the elastic portion, in the first connector, the body portion includes a body portion-side opposing surface opposing the pipe portion, the pipe portion includes a pipe portion-side opposing surface opposing the body portion, the sealing portion is positioned between the body portion-side opposing surface and the pipe portion-side opposing surface, the sealing portion includes a reservoir portion in which the sealing material collects between the body portion-side opposing surface and the pipe portion-side opposing surface, and the valve portion closes an opening portion of the body portion, the second connector includes a body portion including a through hole extending in the axial direction, a pipe portion including a through hole extending in the axial direction, a sealing portion including a sealing material sealing between the body portion and the pipe portion, an elastic portion located in the flow path, and a valve portion that is located in the through hole and moves in the axial direction in accordance with the elastic portion in contact with the elastic portion, and in the second connector, the body portion includes a body portion-side opposing surface opposing the pipe portion, the pipe portion includes a pipe portion-side opposing surface opposing the body portion, the sealing portion is positioned between the body portion-side opposing surface and the pipe portion-side opposing surface, the sealing portion includes a reservoir portion in which the sealing material collects between the body portion-side opposing surface and the pipe portion-side opposing surface, the pipe portion includes a column portion, and the valve portion closes a flow path together with the column portion.

The present disclosure can be used for, for example, a connector and a connection assembly.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A connector comprising:
a flow path extending in an axial direction along a central axis;
a body including a through hole extending in the axial direction;
a pipe including a through hole extending in the axial direction; and
a seal including a sealing material between the body and the pipe; wherein the body includes a body-side opposing surface opposing the pipe;
the pipe includes a pipe-side opposing surface opposing the body;
the seal is between the body-side opposing surface and the pipe-side opposing surface; and
the seal includes a reservoir in which the sealing material collects between the body-side opposing surface and the pipe-side opposing surface;
at least one of the body-side opposing surface and the pipe-side opposing surface includes a cutout surface obtained by cutting out a plane parallel to the axial direction or a radial direction orthogonal to the axial direction;
the seal includes a plurality of reservoirs that include:
an outer diameter-side reservoir on an outermost side in a radial direction among the plurality of reservoirs; and
an inner diameter-side reservoir on an innermost side in a radial direction among the plurality of reservoirs;
a plurality of cutout surfaces define the cutout surface;
the plurality of cutout surfaces include:
an outer diameter-side cutout surface at an outer end in a radial direction of the body-side opposing surface or the pipe-side opposing surface among the plurality of cutout surfaces; and
an inner diameter-side cutout surface communicating with the through hole among the plurality of cutout surfaces;
when the outer diameter-side reservoir and the inner diameter-side reservoir are exposed in the radial direction, a slant with respect to the axial direction of the inner diameter-side cutout surface is smaller than a slant with respect to the axial direction of the outer diameter-side cutout surface; and
when the outer diameter-side reservoir and the inner diameter-side reservoir are exposed in the axial direction, a slant with respect to the radial direction of the inner diameter-side cutout surface is smaller than a slant with respect to the radial direction of the outer diameter-side cutout surface.

2. The connector according to claim 1, further comprising a holder to hold positions of the body and the pipe.

3. The connector according to claim 2, wherein the holder includes a claw extending from one portion of the body and the pipe and hooking on another portion of the body and the pipe;

the claw includes:
a first portion extending in the axial direction from the one portion; and
a second portion extending in a circumferential direction from a tip end of the first portion; and
the second portion opposes the another portion in the axial direction.

4. The connector according to claim 1, wherein the body-side opposing surface and the pipe-side opposing surface oppose each other in the axial direction and a radial direction orthogonal to the central axis.

5. The connector according to claim 4, wherein the seal includes:
a first plate-shaped portion positioned between a side surface of the body and an outer peripheral surface of the pipe opposing each other in the axial direction;
a second plate-shaped portion coupled to the first plate-shaped portion and positioned between an inner peripheral surface of the body and an outer peripheral surface of the pipe opposing each other in the radial direction; and
a third plate-shaped portion coupled to the second plate-shaped portion and positioned between an inner peripheral surface of the body and a side surface of the pipe opposing each other in the axial direction.

6. The connector according to claim 4, wherein
the seal further includes a plate-shaped portion positioned between an inner peripheral surface of the body and an outer peripheral surface of the pipe opposing each other in the radial direction; and
the reservoir includes at least one of a reservoir positioned on one axial side of the plate-shaped portion and a reservoir positioned on another axial side of the plate-shaped portion.

7. The connector according to claim 4, wherein
the seal further includes a plate-shaped portion positioned between an inner peripheral surface of the body and an outer peripheral surface of the pipe opposing each other in the radial direction;
the reservoir includes:
one axial side reservoir positioned on one side in an axial direction of the plate-shaped portion; and
another axial side reservoir positioned on another side in an axial direction of the plate-shaped portion; and
a sectional area of the one axial side reservoir is larger than a sectional area of the axial other side reservoir.

8. The connector according to claim 4, further comprising:
an elastic portion in the flow path; and
a valve in the through hole and movable in the axial direction in accordance with the elastic portion in contact with the elastic portion; wherein
the reservoir is positioned outside in the radial direction relative to the elastic portion and the valve.

9. The connector according to claim 8, wherein the valve closes an opening of the body.

10. The connector according to claim 8, wherein
the pipe includes a column; and
the valve closes the flow path together with the column.

11. The connector according to claim 1, wherein a difference between a solubility parameter of the sealing material and a solubility parameter of a fluid flowing through the flow path is 1 or greater.

12. A connection assembly comprising:
a first connector and a second connector; wherein
each of the first connector and the second connector is provided with a flow path extending in an axial direction along a central axis;
the first connector includes:
a body including a through hole extending in the axial direction;
a pipe including a through hole extending in the axial direction;
a seal including a sealing material between the body and the pipe;
an elastic portion in the flow path; and
a valve in the through hole and movable in the axial direction in accordance with the elastic portion in contact with the elastic portion;
in the first connector:
the body includes a body-side opposing surface opposing the pipe;
the pipe includes a pipe-side opposing surface opposing the body;
the seal is between the body-side opposing surface and the pipe-side opposing surface;
the seal includes a reservoir in which the sealing material collects between the body-side opposing surface and the pipe-side opposing surface; and
the valve closes an opening of the body;
the second connector includes:
a body including a through hole extending in the axial direction;
a pipe including a through hole extending in the axial direction;
a seal including a sealing material sealing between the body and the pipe;
an elastic portion located in the flow path; and
a valve that is located in the through hole and movable in the axial direction in accordance with the elastic portion in contact with the elastic portion; and
in the second connector:
the body includes a body-side opposing surface opposing the pipe;
the pipe includes a pipe-side opposing surface opposing the body;
the seal is between the body-side opposing surface and the pipe-side opposing surface;
the seal includes a reservoir in which the sealing material collects between the body-side opposing surface and the pipe-side opposing surface;
the pipe includes a column; and
the valve closes a flow path together with the column.

* * * * *